United States Patent
Shin et al.

(10) Patent No.: US 11,516,830 B2
(45) Date of Patent: Nov. 29, 2022

(54) METHOD AND DEVICE FOR TRANSMITTING/RECEIVING SIGNAL IN WIRELESS COMMUNICATION SYSTEM

(71) Applicant: LG Electronics Inc., Seoul (KR)

(72) Inventors: Seokmin Shin, Seoul (KR); Suckchel Yang, Seoul (KR); Joonkui Ahn, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/562,584

(22) Filed: Dec. 27, 2021

(65) Prior Publication Data

US 2022/0124758 A1    Apr. 21, 2022

Related U.S. Application Data

(63) Continuation of application No. PCT/KR2020/009166, filed on Jul. 13, 2020.

(30) Foreign Application Priority Data

Jul. 12, 2019  (KR) .................. 10-2019-0084799
Jul. 22, 2019  (KR) .................. 10-2019-0088588

(Continued)

(51) Int. Cl.
*H04W 72/12*     (2009.01)
*H04L 27/26*     (2006.01)
(Continued)

(52) U.S. Cl.
CPC ....... *H04W 72/1268* (2013.01); *H04L 1/1642* (2013.01); *H04L 27/2607* (2013.01); *H04W 72/0453* (2013.01)

(58) Field of Classification Search
CPC .......... H04W 72/1268; H04W 72/0453; H04L 27/2607; H04L 1/1642
See application file for complete search history.

(56) References Cited

U.S. PATENT DOCUMENTS

2011/0243066 A1*  10/2011  Nayeb Nazar ....... H04B 1/7097
                                                      370/328
2013/0010742 A1*   1/2013  Han .................... H04J 13/0003
                                                      370/328
(Continued)

FOREIGN PATENT DOCUMENTS

KR        101835322        3/2018
WO        WO2019027995     2/2019
WO        WO2019029362     2/2019

OTHER PUBLICATIONS

Huawei & HiSilicon, "UL channels and signals in NR unlicensed band," RI-1903927, Presented at 3GPP TSG RAN WG1 Meeting #96bis, Xi'an, China, Apr. 8-12, 2019, 15 pages.

(Continued)

*Primary Examiner* — Brian D Nguyen
(74) *Attorney, Agent, or Firm* — Fish & Richardson P.C.

(57) ABSTRACT

A method and device for transmitting/receiving a signal in a wireless communication system according to an embodiment of the present invention may comprise: repeatedly mapping a PUCCH sequence to each of resource blocks (RBs) in an interlace; and transmitting a PUCCH on the interlace, wherein the CS value of the PUCCH sequence may vary on the basis of values determined by multiplying RB indexes of the respective RBs by a Δ value.

12 Claims, 22 Drawing Sheets

(30) Foreign Application Priority Data

Aug. 1, 2019 (KR) .................. 10-2019-0093965
Nov. 8, 2019 (KR) .................. 10-2019-0142377

(51) Int. Cl.
*H04L 1/16* (2006.01)
*H04W 72/04* (2009.01)

(56) References Cited

U.S. PATENT DOCUMENTS

| | | | |
|---|---|---|---|
| 2013/0028216 A1* | 1/2013 | Baldemair | H04L 5/003 370/329 |
| 2016/0094327 A1* | 3/2016 | Han | H04L 1/0073 370/329 |
| 2018/0152924 A1* | 5/2018 | Ouchi | H04W 72/005 |
| 2018/0199367 A1* | 7/2018 | Jung | H04W 72/1273 |
| 2019/0146876 A1* | 5/2019 | Resch | G06F 3/064 714/764 |
| 2020/0177423 A1* | 6/2020 | Gao | H04L 5/0053 |
| 2020/0344099 A1 | 10/2020 | Sahin et al. | |

OTHER PUBLICATIONS

International Search Report in International Appln. No. PCT/KR2020/009166, dated Oct. 23, 2020, 5 pages (with English translation).

Wilus Inc., "UL channels for NR-unlicensed," R1-1905149, Presented at 3GPP TSG RAN WG1 #96bis, Xi'an, China, Apr. 8- 12, 2019, 3 pages.

Wilus Inc., "UL signals and channels for NR-unlicensed," R1-1907380, Presented at 3GPP TSG RAN WG1 #97, Reno, USA, May 13-17, 2019, 4 pages.

Ericsson, "Enhanced PUCCH design details," R1-1907460, Presented at 3GPP TSG-RAN WG1 Meeting #97, Reno, NV, USA, May 13-17, 2019, 13 pages.

Ericsson, "UL signals and channels for NR-U," R1-1907453, Presented at 3GPP TSG-RAN WG1 Meeting #97, Reno, NV, USA, May 13-17, 2019, 16 pages.

Extended European Search Report in European Appln. No. 20840021.8, dated Jul. 15, 2022, 9 pages.

Qualcomm Incorporated, "UL signals and channels for NR-U," R1-1911096, Presented at 3GPP TSG RAN WG1 Meeting #98bis, Chongqing, CN, October 14-Oct. 20, 2019, 26 pages.

* cited by examiner

Carrier aggregation between L-band and U-band

Standalone U-band(s)

FIG. 12

| Index | PS #0 | PS #1 | PS #2 | PS #3 | PS #4 | PS #5 | PS #6 | PS #7 | PS #8 | PS #9 | PAPR | CM |
|---|---|---|---|---|---|---|---|---|---|---|---|---|
| 107503 | 1 | 0+1i | -1 | -1 | 1 | 0-1i | 0-1i | -1 | 0-1i | -1 | 3.576 | 1.663 |
| 212487 | 1 | 0-1i | 1 | 0-1i | 0-1i | -1 | 1 | 1 | 0+1i | -1 | 3.576 | 1.663 |
| 4824 | 1 | 1 | 1 | 0+1i | 1 | -1 | 0-1i | 0+1i | 0-1i | 0-1i | 3.572 | 1.664 |
| 71183 | 1 | 0+1i | 1 | 0+1i | 0+1i | -1 | 1 | 0-1i | 0-1i | -1 | 3.572 | 1.664 |
| 165824 | 1 | -1 | -1 | 1 | 1 | 0+1i | 0+1i | 0-1i | 0+1i | -1 | 3.572 | 1.664 |
| 237927 | 1 | 0-1i | -1 | -1 | 0-1i | 0-1i | -1 | 1 | 0-1i | 0-1i | 3.572 | 1.664 |
| 44984 | 1 | 1 | 1 | 0+1i | 1 | 1 | 0+1i | 0+1i | 0+1i | 0-1i | 3.572 | 1.665 |
| 135264 | 1 | -1 | -1 | 0-1i | 0-1i | -1 | 1 | -1 | 0-1i | -1 | 3.572 | 1.665 |
| 209965 | 1 | 0-1i | 1 | 0+1i | 1 | 0-1i | 0+1i | 0-1i | 0-1i | 1 | 3.57 | 1.668 |
| 12926 | 1 | 1 | 1 | 1 | -1 | 0+1i | -1 | 1 | 0-1i | 0+1i | 3.57 | 1.669 |
| 72741 | 1 | 0-1i | -1 | -1 | 0+1i | 0+1i | -1 | 0+1i | 0+1i | 1 | 3.574 | 1.669 |
| 99141 | 1 | 0+1i | 1 | -1 | -1 | 0+1i | -1 | -1 | 0+1i | 0+1i | 3.576 | 1.669 |
| 167318 | 1 | -1 | -1 | 1 | 0-1i | 0+1i | -1 | 0+1i | 0-1i | 0+1i | 3.576 | 1.669 |
| 229837 | 1 | 0-1i | -1 | 0-1i | 0+1i | 0+1i | 0-1i | 0+1i | 0-1i | 0+1i | 3.572 | 1.669 |
| 42398 | 1 | 1 | -1 | -1 | 1 | 1 | -1 | 0+1i | 0-1i | 0+1i | 3.584 | 1.671 |
| 143606 | 1 | -1 | 1 | 0-1i | -1 | 0+1i | 0-1i | -1 | 0+1i | -1 | 3.584 | 1.671 |
| 2551 | 1 | 0+1i | 0-1i | 0-1i | 0+1i | 1 | -1 | 0+1i | -1 | -1 | 3.846 | 1.963 |
| 128171 | 1 | 1 | 0-1i | 1 | -1 | 1 | -1 | 1 | 0-1i | 0-1i | 3.846 | 1.963 |
| 52508 | 1 | 0+1i | -1 | 0-1i | 0-1i | 1 | 0-1i | 0+1i | -1 | 0-1i | 3.849 | 1.964 |
| 112848 | 1 | 0+1i | -1 | 0-1i | -1 | 1 | 0-1i | 1 | 0-1i | 0-1i | 3.849 | 1.964 |

FIG. 13

| Index | PS #0 | PS #1 | PS #2 | PS #3 | PS #4 | PS #5 | PS #6 | PS #7 | PS #8 | PS #9 | PS #10 | PAPR | CM |
|---|---|---|---|---|---|---|---|---|---|---|---|---|---|
| 43171 | 1 | 1 | 1 | -1 | -1 | -1 | 1 | -1 | -1 | 1 | -1 | 2.892 | 1.094 |
| 532523 | 1 | -1 | 1 | 1 | -1 | 1 | 1 | 1 | -1 | -1 | -1 | 2.892 | 1.094 |
| 421477 | 1 | 0-1i | -1 | 0+1i | -1 | 0-1i | -1 | 0+1i | -1 | 0+1i | 1 | 2.894 | 1.095 |
| 976621 | 1 | 0-1i | -1 | 0-1i | -1 | 0+1i | -1 | 0-1i | -1 | 0-1i | 1 | 2.894 | 1.095 |
| 403109 | 1 | 0+1i | -1 | 1 | -1 | 0+1i | 1 | -1 | -1 | 0+1i | 1 | 3.532 | 1.491 |
| 962093 | 1 | 0-1i | -1 | -1 | -1 | 0-1i | -1 | 0-1i | -1 | 0-1i | -1 | 3.532 | 1.491 |
| 24803 | 1 | 1 | 1 | 0+1i | -1 | 1 | 1 | 0-1i | -1 | 1 | 1 | 3.526 | 1.492 |
| 57443 | 1 | -1 | 1 | 0-1i | -1 | -1 | -1 | 0+1i | -1 | -1 | -1 | 3.53 | 1.492 |
| 551147 | 1 | -1 | -1 | 0-1i | -1 | 1 | -1 | 0+1i | -1 | -1 | -1 | 3.53 | 1.492 |
| 583787 | 1 | 0+1i | 1 | 1 | -1 | 0+1i | 1 | 1 | -1 | 0+1i | 1 | 3.526 | 1.492 |
| 435749 | 1 | 0+1i | -1 | 0+1i | -1 | 0+1i | -1 | 0-1i | -1 | 0+1i | 1 | 3.528 | 1.493 |
| 929453 | 1 | 0-1i | -1 | -1 | -1 | 0-1i | -1 | 1 | -1 | 0-1i | 1 | 3.528 | 1.493 |
| 244770 | 1 | 1 | 0-1i | -1 | 0-1i | 0-1i | 1 | 0-1i | -1 | 1 | 0+1i | 3.52 | 1.617 |
| 482022 | 1 | 0+1i | 0-1i | 0+1i | 0+1i | 1 | -1 | 1 | -1 | 0+1i | 0+1i | 3.52 | 1.617 |
| 103460 | 1 | 1 | 0+1i | -1 | 0+1i | 0+1i | 1 | 1 | -1 | 1 | 0-1i | 3.52 | 1.62 |
| 357096 | 1 | 0+1i | 0+1i | 0+1i | 0-1i | -1 | -1 | 0-1i | -1 | 0+1i | 0-1i | 3.518 | 1.62 |
| 597164 | 1 | -1 | 0+1i | 0+1i | 0+1i | -1 | 1 | 0+1i | -1 | -1 | 0-1i | 3.518 | 1.62 |
| 916880 | 1 | 0-1i | 0+1i | 1 | 0-1i | -1 | -1 | -1 | -1 | 0-1i | 0-1i | 3.52 | 1.62 |
| 734578 | 1 | -1 | 0-1i | 1 | 0-1i | 0+1i | -1 | 1 | -1 | -1 | 0+1i | 3.518 | 1.621 |
| 1036910 | 1 | 0-1i | 0-1i | 0-1i | 0+1i | 1 | -1 | 0+1i | -1 | 0-1i | 0+1i | 3.518 | 1.621 |

FIG. 15

| Index | PS #0 | PS #1 | PS #2 | PS #3 | PS #4 | PS #5 | PS #6 | PS #7 | PS #8 | PS #9 | PAPR | CM |
|---|---|---|---|---|---|---|---|---|---|---|---|---|
| 89509 | 1 | 0+1i | 0+1i | 0+1i | 0-1i | 0+1i | -1 | -1 | 0+1i | 1 | 3.561 | 1.557 |
| 60472 | 1 | 1 | 0-1i | -1 | 0-1i | 1 | 1 | 0-1i | 0+1i | 0-1i | 3.563 | 1.56 |
| 146512 | 1 | -1 | 1 | 0-1i | 0-1i | 1 | 0+1i | 0+1i | 0-1i | 0+1i | 3.561 | 1.56 |
| 183830 | 1 | 0-1i | 0-1i | 1 | 0-1i | -1 | 1 | 1 | 0+1i | -1 | 3.557 | 1.56 |
| 229255 | 1 | 1 | 0+1i | 0-1i | 0-1i | 0-1i | -1 | -1 | 0-1i | 0+1i | 3.565 | 1.56 |
| 7790 | 1 | 0-1i | 1 | 0+1i | 0-1i | -1 | 0+1i | 0-1i | 0+1i | 1 | 3.561 | 1.561 |
| 241149 | 1 | 0+1i | -1 | -1 | 0-1i | 0+1i | 0-1i | 0+1i | 0-1i | -1 | 3.563 | 1.561 |
| 102367 | 1 | 0+1i | -1 | 1 | 0-1i | 0-1i | 0-1i | 0+1i | 0+1i | -1 | 3.557 | 1.564 |
| 87567 | 1 | 0-1i | 0+1i | 0+1i | 0+1i | 0+1i | 1 | 0+1i | 0+1i | -1 | 3.618 | 1.647 |
| 237911 | 1 | -1 | 1 | -1 | 1 | 1 | -1 | -1 | 0+1i | -1 | 3.621 | 1.649 |
| 143590 | 1 | 1 | 0-1i | 0+1i | 0+1i | 0+1i | 0-1i | 0+1i | 0+1i | 0+1i | 3.618 | 1.652 |
| 58782 | 1 | -1 | 0-1i | -1 | 0-1i | -1 | -1 | 0+1i | 0-1i | -1 | 3.62 | 1.653 |
| 191798 | 1 | 0-1i | 0-1i | 1 | 0-1i | 0-1i | 0+1i | 0-1i | 0+1i | 0+1i | 3.616 | 1.653 |
| 220839 | 1 | 0+1i | 0+1i | 0+1i | 1 | -1 | 0+1i | -1 | 0+1i | -1 | 3.612 | 1.653 |
| 37614 | 1 | 1 | 1 | 1 | 1 | -1 | 1 | -1 | 0+1i | 0+1i | 3.612 | 1.654 |
| 4808 | 1 | 1 | -1 | 1 | 1 | 0-1i | 0+1i | 0+1i | 0+1i | 0+1i | 3.621 | 1.655 |
| 66399 | 1 | 0+1i | 1 | 1 | 1 | 0-1i | 0+1i | 0-1i | 0-1i | -1 | 3.61 | 1.655 |
| 99189 | 1 | 0+1i | -1 | 1 | 1 | 0-1i | 0+1i | -1 | 0-1i | 1 | 3.62 | 1.655 |
| 226349 | 1 | 0-1i | 0+1i | 0-1i | 0+1i | 0+1i | 0+1i | 0-1i | 0-1i | 1 | 3.621 | 1.655 |
| 205181 | 1 | 0-1i | 1 | -1 | 1 | 0+1i | 0+1i | 0-1i | 0-1i | 1 | 3.618 | 1.656 |

FIG. 16

| Index | PS #0 | PS #1 | PS #2 | PS #3 | PS #4 | PS #5 | PS #6 | PS #7 | PS #8 | PS #9 | PS #10 | PAPR | CM |
|---|---|---|---|---|---|---|---|---|---|---|---|---|---|
| 206342 | 1 | 1 | 0-1i | 1 | -1 | 0+1i | -1 | 1 | -1 | 0+1i | 0+1i | 3.67 | 1.645 |
| 366498 | 1 | 0-1i | 0+1i | -1 | 0+1i | 0+1i | 0+1i | -1 | -1 | 1 | 0+1i | 3.672 | 1.646 |
| 250352 | 1 | 1 | 0-1i | 0-1i | 0+1i | 1 | 0+1i | 0-1i | -1 | 0-1i | 0-1i | 3.674 | 1.65 |
| 428289 | 1 | 0+1i | -1 | -1 | 1 | -1 | 1 | -1 | 1 | 1 | 1 | 3.685 | 1.651 |
| 876612 | 1 | 0+1i | 0+1i | 0+1i | -1 | 1 | 1 | 0+1i | 1 | 1 | 0+1i | 3.67 | 1.651 |
| 387276 | 1 | 0+1i | 0+1i | 0-1i | 1 | 1 | 0-1i | 0-1i | 1 | -1 | 0-1i | 3.674 | 1.652 |
| 544711 | 1 | -1 | 1 | 0+1i | 1 | 0-1i | -1 | 0-1i | -1 | 0+1i | -1 | 3.685 | 1.652 |
| 859946 | 1 | 0-1i | 0+1i | 1 | 0+1i | 0-1i | 0-1i | 1 | -1 | -1 | -1 | 3.674 | 1.652 |
| 450155 | 1 | 0-1i | -1 | 0-1i | 0+1i | 0-1i | -1 | 0+1i | 1 | -1 | 0+1i | 3.685 | 1.653 |
| 765582 | 1 | -1 | 0-1i | 0+1i | -1 | -1 | 0+1i | -1 | 1 | 0-1i | 0-1i | 3.672 | 1.655 |
| 743784 | 1 | -1 | 0-1i | -1 | 0+1i | 1 | 1 | 0+1i | -1 | 0+1i | 1 | 3.672 | 1.656 |
| 917897 | 1 | 0-1i | 1 | -1 | 0+1i | -1 | 0+1i | -1 | 1 | -1 | 1 | 3.681 | 1.657 |
| 561197 | 1 | -1 | -1 | 1 | 0+1i | 0+1i | 1 | 0-1i | -1 | 0-1i | -1 | 3.685 | 1.661 |
| 939747 | 1 | 0-1i | 1 | 0-1i | 1 | -1 | -1 | -1 | 1 | 0+1i | 1 | 3.681 | 1.661 |
| 6309 | 1 | 1 | 1 | 0-1i | 1 | 0+1i | 1 | 0+1i | 1 | 0-1i | -1 | 3.687 | 1.662 |
| 51023 | 1 | -1 | 1 | 0-1i | -1 | -1 | -1 | 1 | 1 | 0+1i | -1 | 3.687 | 1.664 |
| 780486 | 1 | 0+1i | 0-1i | 1 | 1 | 0+1i | 1 | 0+1i | -1 | 1 | 0+1i | 3.715 | 1.739 |
| 337412 | 1 | 0-1i | 0+1i | 1 | 0+1i | -1 | 1 | 1 | 1 | -1 | 0+1i | 3.715 | 1.74 |
| 359274 | 1 | 0+1i | 0+1i | 1 | -1 | -1 | 0-1i | 0+1i | 1 | 0-1i | 0-1i | 3.715 | 1.741 |
| 736660 | 1 | -1 | 0-1i | 1 | 0-1i | 0-1i | 0+1i | 1 | -1 | 0-1i | 0-1i | 3.715 | 1.743 |

FIG. 17

| Index | PS #0 | PS #1 | PS #2 | PS #3 | PS #4 | PS #5 | PS #6 | PS #7 | PS #8 | PS #9 | PAPR | CM |
|---|---|---|---|---|---|---|---|---|---|---|---|---|
| 1 | 1 | 1 | 1 | 1 | 1 | 1 | 1 | 1 | 1 | 1 | 3.54 | 1.569 |
| 111026 | 1 | 0+1i | -1 | 0-1i | 1 | 0+1i | -1 | 0-1i | 1 | 0+1i | 3.54 | 1.571 |
| 139811 | 1 | -1 | 1 | -1 | 1 | -1 | 1 | -1 | 1 | -1 | 3.543 | 1.574 |
| 234388 | 1 | 0-1i | -1 | 0+1i | 1 | 0-1i | -1 | 0+1i | 1 | 0-1i | 3.543 | 1.58 |
| 342 | 1 | 1 | 1 | 1 | 1 | 1 | 1 | 1 | 0+1i | 0+1i | 4.001 | 2.123 |
| 233701 | 1 | 0-1i | -1 | 0+1i | 1 | 0+1i | -1 | 0-1i | 0+1i | 0-1i | 3.995 | 2.125 |
| 162276 | 1 | -1 | 0+1i | 0-1i | -1 | 1 | 0-1i | 0+1i | 1 | 0-1i | 4.056 | 2.357 |
| 256593 | 1 | 0-1i | 0-1i | 0+1i | -1 | -1 | 0+1i | -1 | 1 | 1 | 4.054 | 2.363 |
| 116851 | 1 | 0+1i | 0-1i | 1 | -1 | 1 | 0+1i | 0-1i | 1 | -1 | 4.05 | 2.365 |
| 23490 | 1 | 1 | 0+1i | 0+1i | 1 | 0-1i | 0-1i | 1 | 1 | 0+1i | 4.047 | 2.372 |
| 256337 | 1 | 0+1i | 0+1i | -1 | -1 | 0+1i | 0-1i | 0+1i | 1 | 1 | 4.059 | 2.543 |
| 162020 | 1 | -1 | 0+1i | 0-1i | -1 | 1 | 1 | -1 | 1 | 0-1i | 4.066 | 2.545 |
| 22 | 1 | 1 | 1 | 1 | 1 | 1 | 1 | 0-1i | 0+1i | 0+1i | 4.078 | 2.624 |
| 234405 | 1 | 0-1i | 0+1i | 0+1i | 0+1i | -1 | -1 | 0+1i | 0+1i | -1 | 4.081 | 2.633 |
| 160927 | 1 | -1 | 0+1i | 0-1i | 0+1i | 1 | -1 | -1 | 0-1i | 0+1i | 4.096 | 2.636 |
| 116526 | 1 | 0+1i | 0-1i | 1 | 1 | 0+1i | 1 | 0-1i | 0-1i | -1 | 4.086 | 2.64 |
| 139832 | 1 | 0-1i | 0+1i | -1 | 0+1i | -1 | -1 | 1 | 0-1i | 0-1i | 4.083 | 2.642 |
| 255248 | 1 | 0+1i | 0+1i | 0-1i | 0+1i | 0+1i | 1 | 0-1i | 0-1i | 0-1i | 4.091 | 2.642 |
| 22205 | 1 | 1 | 0+1i | 0-1i | 1 | -1 | -1 | 1 | 0+1i | 1 | 4.09 | 2.645 |
| 110983 | 1 | 0+1i | -1 | 0-1i | 1 | 0+1i | -1 | -1 | 0+1i | -1 | 4.659 | 3.884 |

FIG. 18

| Index | PS #0 | PS #1 | PS #2 | PS #3 | PS #4 | PS #5 | PS #6 | PS #7 | PS #8 | PS #9 | PS #10 | PAPR | CM |
|---|---|---|---|---|---|---|---|---|---|---|---|---|---|
| 444103 | 1 | 0+1i | -1 | 0+1i | 1 | 0+1i | -1 | 0+1i | 1 | 0+1i | -1 | 3.343 | 1.411 |
| 1 | 1 | 1 | 1 | 1 | 1 | 1 | 1 | 1 | 1 | 1 | 1 | 3.351 | 1.413 |
| 937551 | 1 | 0-1i | -1 | 0+1i | 1 | 0-1i | -1 | 0+1i | 1 | 0-1i | -1 | 3.345 | 1.419 |
| 559241 | 1 | -1 | 1 | -1 | 1 | -1 | 1 | -1 | 1 | -1 | 1 | 3.343 | 1.42 |
| 111026 | 1 | 1 | 0+1i | -1 | 0-1i | 0+1i | 0+1i | -1 | 0-1i | 1 | 0+1i | 3.862 | 1.893 |
| 489336 | 1 | 0+1i | 0-1i | 0+1i | 0-1i | 0+1i | 0-1i | 0+1i | 0-1i | 0+1i | 0-1i | 3.862 | 1.896 |
| 1048576 | 1 | 0-1i | 0-1i | 0-1i | 0-1i | 0-1i | 0-1i | 0-1i | 0-1i | 0-1i | 0-1i | 3.855 | 1.897 |
| 604474 | 1 | -1 | 0+1i | 1 | 0-1i | -1 | 0+1i | 1 | 0-1i | -1 | 0+1i | 3.86 | 1.903 |
| 937552 | 1 | 0+1i | -1 | 0+1i | 1 | 0+1i | -1 | 0+1i | 1 | 0+1i | -1 | 3.853 | 1.924 |
| 2 | 1 | -1 | 1 | -1 | 1 | -1 | 1 | -1 | 1 | -1 | 1 | 3.846 | 1.927 |
| 559242 | 1 | -1 | 1 | -1 | 1 | -1 | 1 | -1 | 1 | -1 | 1 | 3.853 | 1.929 |
| 444104 | 1 | 0+1i | 0+1i | 0-1i | 1 | 0+1i | 1 | 0+1i | 1 | 0+1i | 1 | 3.843 | 1.932 |
| 647801 | 1 | -1 | 0-1i | -1 | -1 | 1 | 1 | 1 | 0-1i | -1 | -1 | 3.869 | 2.158 |
| 1025087 | 1 | 0-1i | 0-1i | 0-1i | -1 | 0+1i | -1 | 0+1i | 0-1i | 0-1i | -1 | 3.876 | 2.162 |
| 371735 | 1 | 0+1i | 0-1i | 1 | -1 | 0-1i | -1 | 1 | 0+1i | 0+1i | 1 | 3.885 | 2.164 |
| 470199 | 1 | 0+1i | 0-1i | 0+1i | -1 | 0-1i | 1 | -1 | 0+1i | 0+1i | 1 | 3.871 | 2.164 |
| 256593 | 1 | 1 | 0-1i | 0+1i | -1 | -1 | -1 | 0+1i | 0+1i | 1 | 1 | 3.887 | 2.168 |
| 92913 | 1 | 1 | 0+1i | 0+1i | -1 | 1 | -1 | 0-1i | 0+1i | -1 | 1 | 3.88 | 2.171 |
| 746201 | 1 | -1 | 0-1i | 0+1i | -1 | -1 | -1 | 0-1i | 0+1i | 1 | 1 | 3.883 | 2.171 |
| 861343 | 1 | 0-1i | 0+1i | 1 | -1 | 0+1i | 1 | -1 | 0+1i | 0-1i | -1 | 3.887 | 2.173 |

FIG. 20

| 2bits A/N + SR | UE1 NN Neg | UE1 NN Pos | UE1 NA Neg | UE1 NA Pos | UE1 AA Neg | UE1 AA Pos | UE1 AN Neg | UE1 AN Pos |
|---|---|---|---|---|---|---|---|---|
| X<br>M0+Mcs= | 1 | 7 | 1 | 7 | 1 | 7 | 1 | 7 |
| PRB index i | | | | | | | | |
| 0 | 0 | 0 | 3 | 3 | 6 | 6 | 9 | 9 |
| 1 | 1 | 7 | 4 | 10 | 7 | 1 | 10 | 4 |
| 2 | 2 | 2 | 5 | 5 | 8 | 8 | 11 | 11 |
| 3 | 3 | 9 | 6 | 0 | 9 | 3 | 0 | 6 |
| 4 | 4 | 4 | 7 | 7 | 10 | 10 | 1 | 1 |
| 5 | 5 | 11 | 8 | 2 | 11 | 5 | 2 | 8 |
| 6 | 6 | 6 | 9 | 9 | 0 | 0 | 3 | 3 |
| 7 | 7 | 1 | 10 | 4 | 1 | 7 | 4 | 10 |
| 8 | 8 | 8 | 11 | 11 | 2 | 2 | 5 | 5 |
| 9 | 9 | 3 | 0 | 6 | 3 | 9 | 6 | 0 |
| 10 | 10 | 10 | 1 | 1 | 4 | 4 | 7 | 7 |

FIG. 21

| Sequence length | PAPR (dB) | CM (dB) | (Sequence length) mod 12 |
|---|---|---|---|
| 131 | 3.7994 | 3.37 | 131 mod 12 = 11 |
| 127 | 3.8265 | 2.59 | 127 mod 12 = 7 |
| 113 | 3.7612 | 2.263 | 113 mod 12 = 5 |
| 109 | 3.8516 | 2.788 | 109 mod 12 = 1 |
| 107 | 3.8337 | 2.659 | 107 mod 12 = 11 |
| 103 | 3.7685 | 2.26 | 103 mod 12 = 7 |
| 101 | 3.8337 | 2.286 | 101 mod 12 = 5 |
| 97 | 4.1137 | 3.185 | 97 mod 12 = 1 |
| 89 | 3.9296 | 2.375 | 89 mod 12 = 5 |

FIG. 22

| Sequence length | PAPR (dB) | CM (dB) | (Sequence length) mod 12 |
|---|---|---|---|
| 113 | 3.8157 | 2.407 | 113 mod 12 = 5 |
| 109 | 3.7722 | 2.912 | 109 mod 12 = 1 |
| 107 | 3.7502 | 2.908 | 107 mod 12 = 11 |
| 103 | 3.7282 | 2.253 | 103 mod 12 = 7 |
| 101 | 3.7685 | 2.299 | 101 mod 12 = 5 |
| 97 | 3.912 | 2.997 | 97 mod 12 = 1 |
| 89 | 3.8694 | 2.424 | 89 mod 12 = 5 |
| 83 | 4.1606 | 3.226 | 83 mod 12 = 11 |
| 79 | 3.8908 | 2.329 | 79 mod 12 = 7 |

FIG. 23

| Sequence length | PAPR (dB) | CM (dB) | (Sequence length) mod 12 |
|---|---|---|---|
| 107 | 3.8408 | 3.194 | 107 mod 12 = 11 |
| 103 | 3.8211 | 2.518 | 103 mod 12 = 7 |
| 101 | 3.7885 | 2.661 | 101 mod 12 = 5 |
| 97 | 3.7831 | 2.943 | 97 mod 12 = 1 |
| 89 | 3.7612 | 2.394 | 89 mod 12 = 5 |
| 83 | 3.9243 | 2.719 | 83 mod 12 = 11 |
| 79 | 3.8247 | 2.326 | 79 mod 12 = 7 |
| 73 | 4.316 | 3.651 | 73 mod 12 = 1 |

METHOD AND DEVICE FOR TRANSMITTING/RECEIVING SIGNAL IN WIRELESS COMMUNICATION SYSTEM

CROSS-REFERENCE TO RELATED APPLICATIONS

This application is a continuation of International Application No. PCT/KR2020/009166, filed on Jul. 13, 2020, which claims priority under 35 U.S.C. 119(e) to Korean Application Nos. 10-2019-0084799, filed on Jul. 12, 2019, 10-2019-0088588, filed on Jul. 22, 2019, 10-2019-0093965, filed on Aug. 1, 2019 and 10-2019-0142377, filed on Nov. 8, 2019. The disclosures of the prior applications are incorporated by reference in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method and apparatus for transmitting an uplink channel efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In an aspect of the present disclosure, a method of transmitting and receiving a signal by a user equipment (UE) operating in a wireless communication system is provided. The method may include: repeatedly mapping a physical uplink control channel (PUCCH) sequence to each of resource blocks (RBs) in an interlace; and transmitting a PUCCH including the PUCCH sequence in the interlace. A cyclic shift (CS) value of the PUCCH sequence may vary depending on a value determined by multiplying an RB index of each RB by a $\Delta$ value.

In another aspect of the present disclosure, a communication apparatus (UE) configured to transmit and receive a signal in a wireless communication system is provided. The communication apparatus may include: at least one transceiver; at least one processor; and at least one memory operably connected to the at least one processor and configured to store instructions that, when executed, cause the at least one processor to perform operations including: repeatedly mapping a PUCCH sequence to each of RBs in an interlace; and transmitting a PUCCH including the PUCCH sequence in the interlace. A CS value of the PUCCH sequence may vary depending on a value determined by multiplying an RB index of each RB by a $\Delta$ value.

In another aspect of the present disclosure, an apparatus for a UE is provided. The apparatus may include: at least one processor; and at least one computer memory operably connected to the at least one processor and configured to, when executed, cause the at least one processor to perform operations including: repeatedly mapping a PUCCH sequence to each of RBs in an interlace; and transmitting a PUCCH including the PUCCH sequence in the interlace. A CS value of the PUCCH sequence may vary depending on a value determined by multiplying an RB index of each RB by a $\Delta$ value.

In a further aspect of the present disclosure, a computer-readable storage medium having at least one computer program that, when executed, cause at least one processor to perform operations. The operations may include: repeatedly mapping a PUCCH sequence to each of RBs in an interlace; and transmitting a PUCCH including the PUCCH sequence in the interlace. A CS value of the PUCCH sequence may vary depending on a value determined by multiplying an RB index of each RB by a $\Delta$ value.

In the method and apparatuses, the $\Delta$ value may be 5.

In the method and apparatuses, RB indices may be assigned sequentially to the RBs based on frequency positions of the RBs in the interlace.

In the method and apparatuses, a modulo operation may be performed on the value determined by multiplying the RB index of each RB by the $\Delta$ value and a number of subcarriers in each RB.

In the method and apparatuses, a phase shift (PS) value may be applied to each RB, and the PS value may be determined based on the RB index of each RB.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication apparatus may transmit an uplink channel more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 10 to 25 are a diagram illustrating uplink (UL) channel transmission according to the embodiments of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
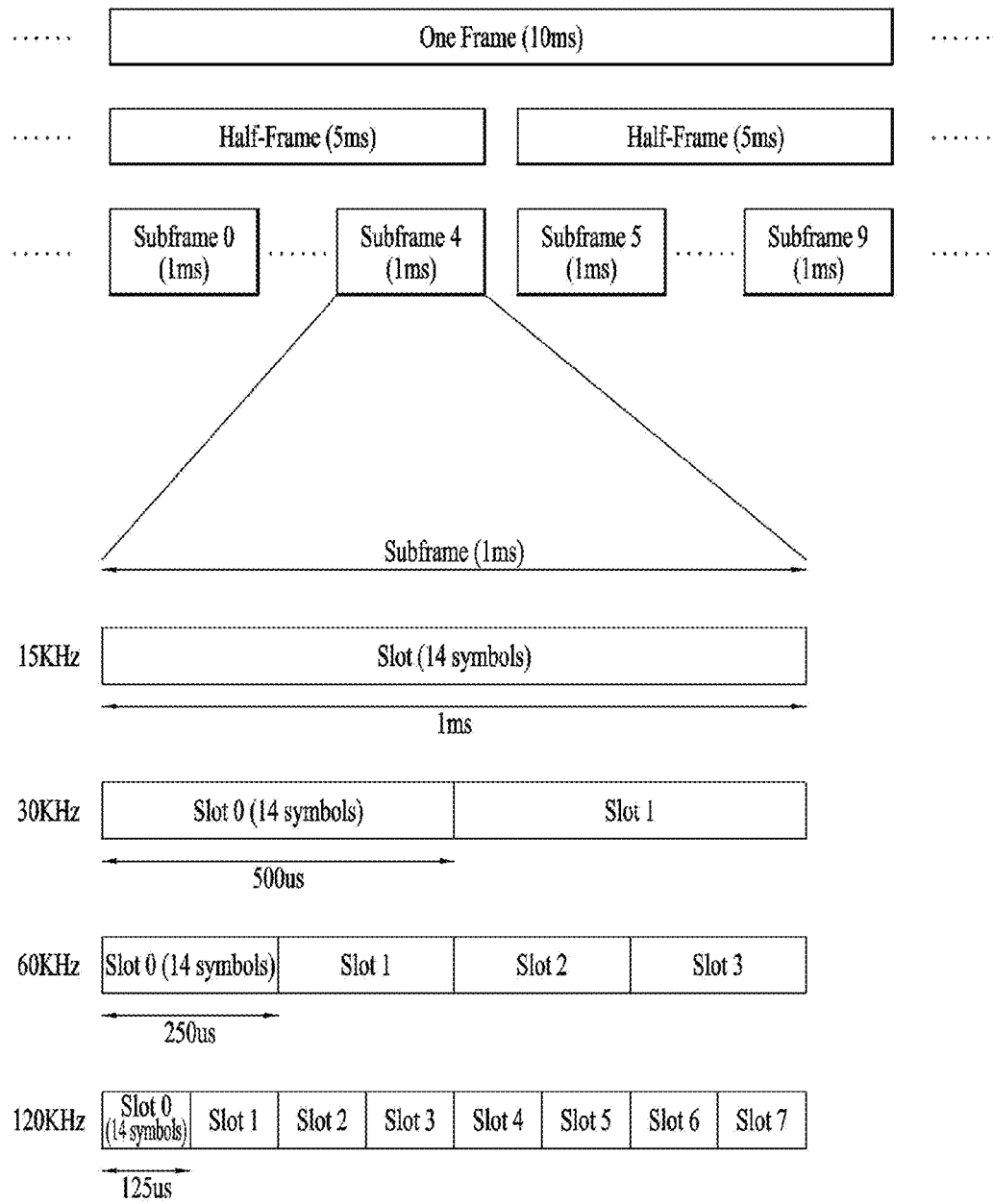
FIG. 1 illustrates a radio frame structure.

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 2:
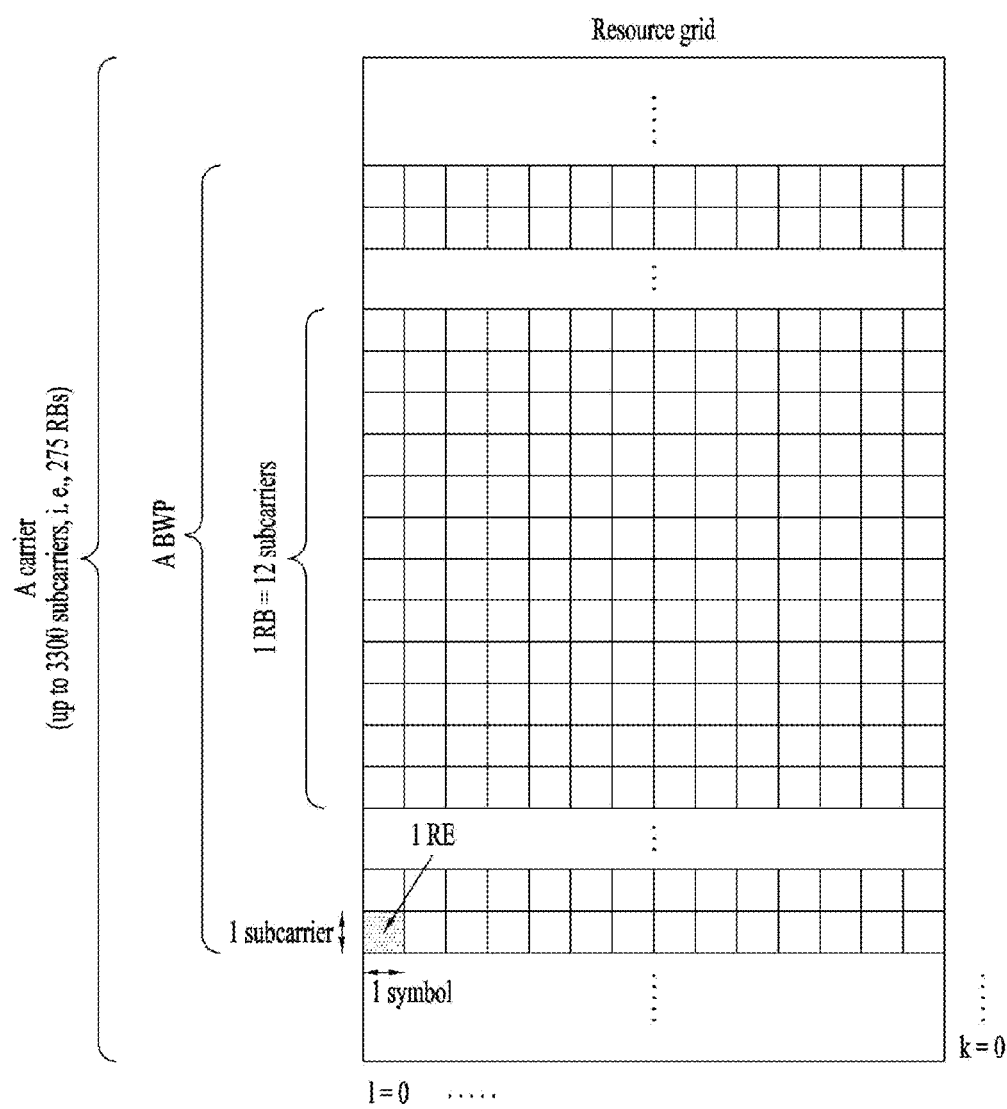
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
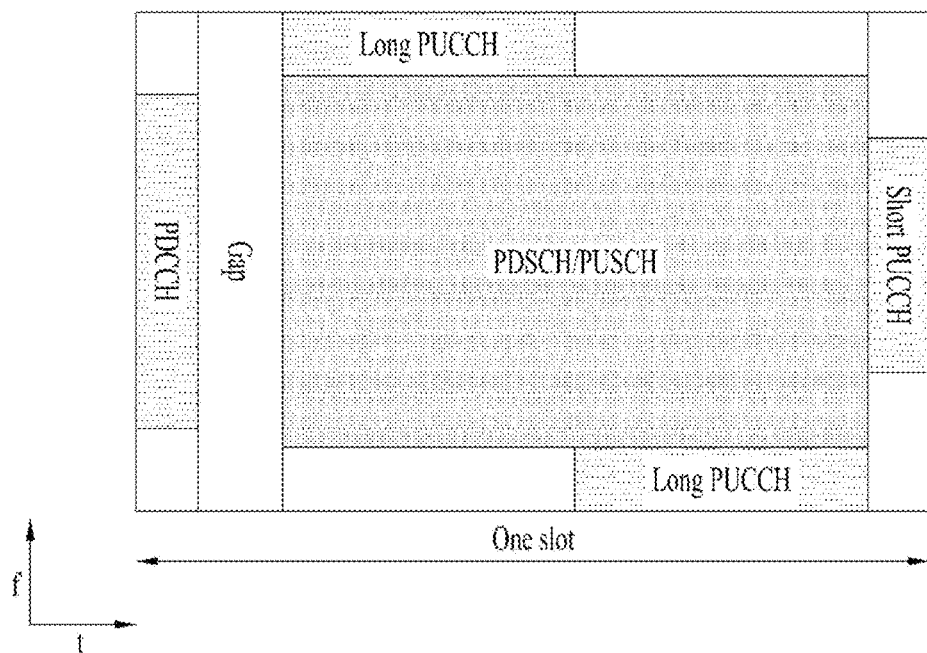
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (NACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 4 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 4

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)
Supportable UCI payload size: up to K bits (e.g., K=2)
Number of OFDM symbols included in one PUCCH: 1 to X symbols (e.g., X=2)
Transmission structure: only a UCI signal is configured with no DM-RS, and a UCI state is transmitted by selecting and transmitting one of a plurality of sequences.
(1) PUCCH Format 1 (PF1)
Supportable UCI payload size: up to K bits (e.g., K=2)
Number of OFDM symbols included in one PUCCH: Y to Z symbols (e.g., Y=4 and Z=14)
Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).
(2) PUCCH Format 2 (PF2)
Supportable UCI payload size: more than K bits (e.g., K=2)
Number of OFDM symbols included in one PUCCH: 1 to X symbols (e.g., X=2)
Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT
(3) PUCCH Format 3 (PF3)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.
(4) PUCCH Format 4 (PF4 or F4)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. The DFT is applied to encoded UCI bits with no multiplexing between UEs.

Figure 4:
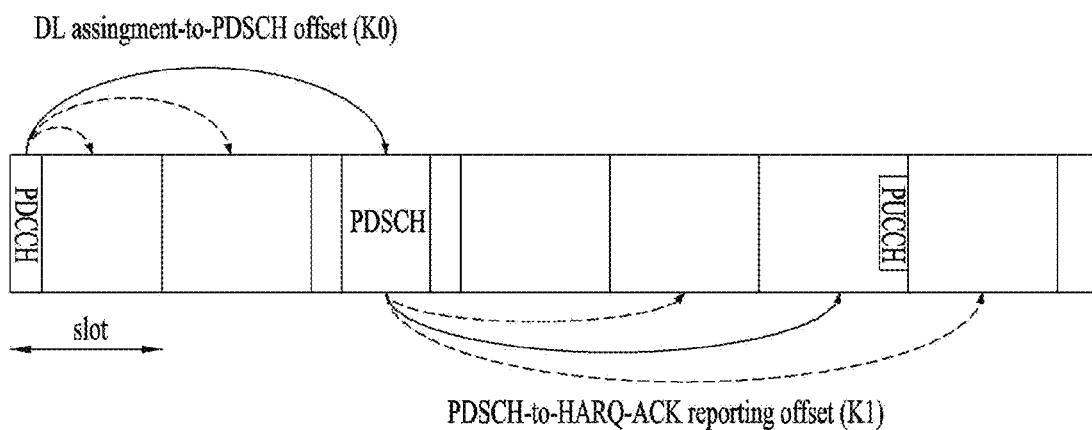
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.
Time domain resource assignment: Indicates K0 and the starting position (e.g., OFDM symbol index) and length (e.g., the number of OFDM symbols) of the PDSCH in a slot.
PDSCH-to-HARQ feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

1. Wireless Communication System Supporting Unlicensed Band

Figure 5A:
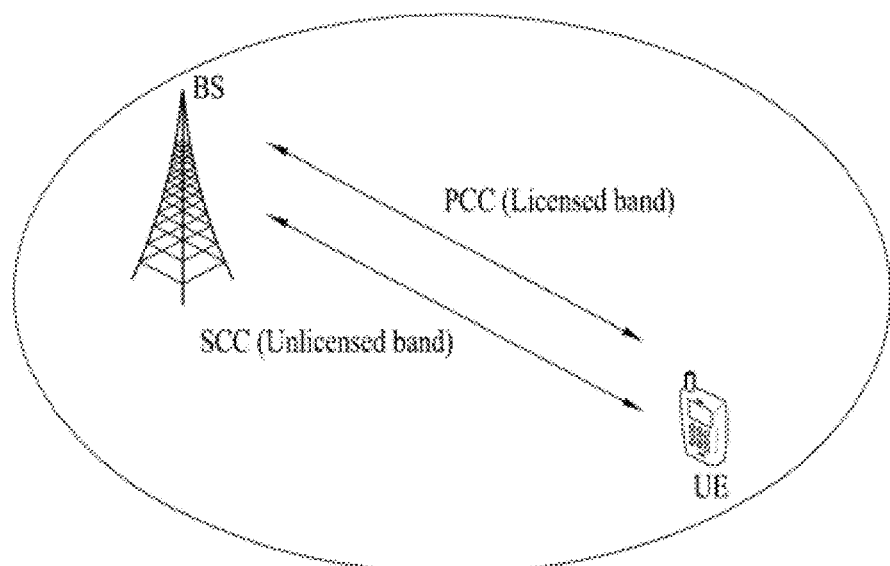
FIGS. 5A and 5B illustrate a wireless communication system supporting an unlicensed band.
Figure 5B:
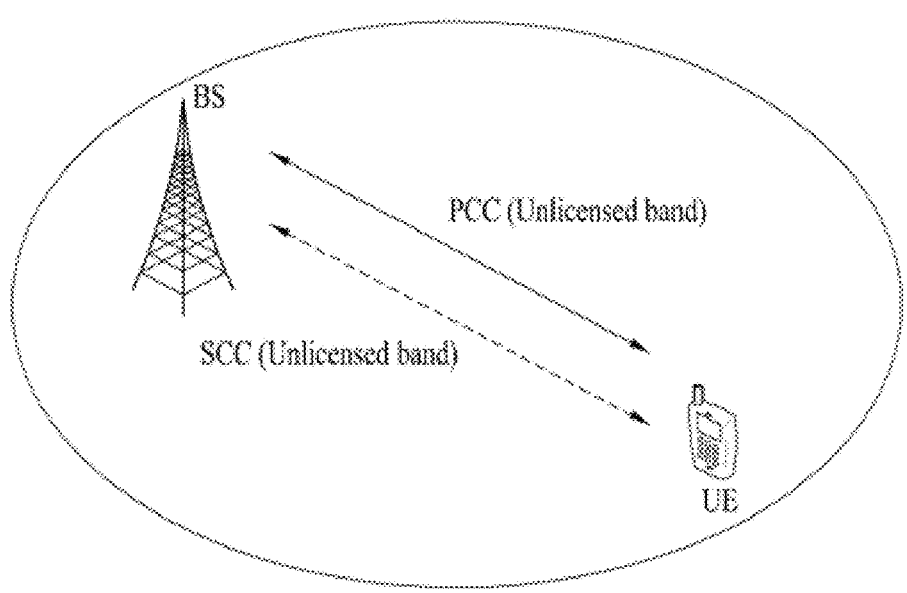

FIGS. 5A and 5B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 5A, the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 5B. In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}$=9 us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 6:
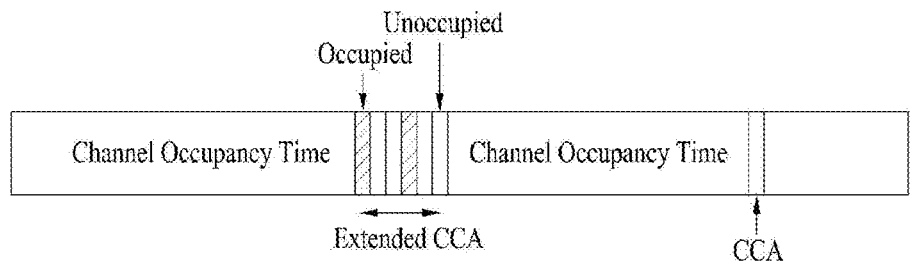
FIG. 6 illustrates an exemplary method of occupying resources in an unlicensed band.

FIG. 6 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-band

The BS may perform one of the following U-band access procedures (e.g., CAPs) for DL signal transmission in a U-band (1) Type 1 DL CAP Method In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

Figure 7:
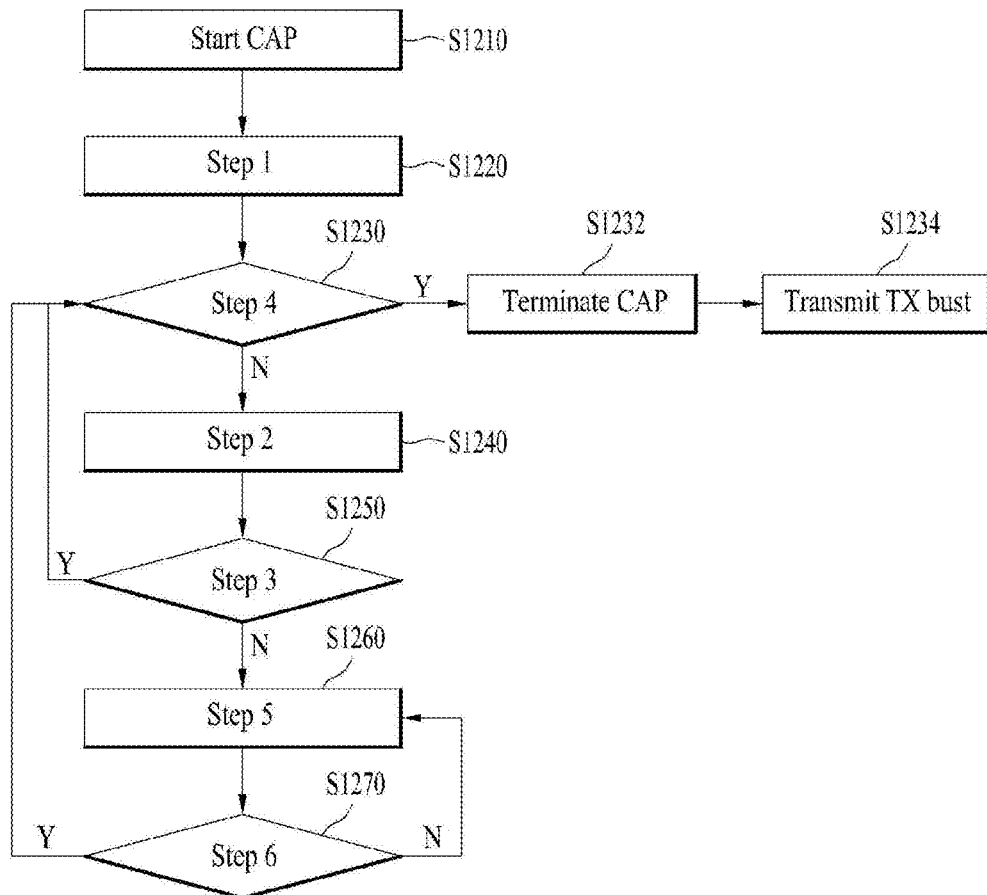
FIGS. 7 and 8 are flowcharts illustrating channel access procedures (CAPs) for signal transmission in an unlicensed band.

FIG. 7 is a flowchart illustrating CAP operations performed by a BS to transmit a DL signal in a U-band.

Referring to FIG. 7, the BS may sense whether a channel is idle for sensing slot durations of a defer duration $T_d$. Then, if a counter N is zero, the BS may perform transmission (S1234). In this case, the BS may adjust the counter N by sensing the channel for additional sensing slot duration(s) according to the following steps:

Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration $T_d$ or all the slots of the additional defer duration $T_d$ are detected to be idle.

Step 6) (S1270) If the channel is sensed to be idle for all the slot durations of the additional defer duration $T_d$ (Y), step 4 proceeds. Otherwise (N), step 5 proceeds.

Table 5 shows that $m_p$, a minimum contention window (CW), a maximum CW, a maximum channel occupancy time (MCOT), and an allowed CW size, which are applied to the CAP, vary depending on channel access priority classes.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$, where the duration $T_f$ includes a sensing slot at the beginning thereof.

Transmission(s) initiated by the BS including (i) a discovery burst only or (ii) a discovery burst multiplexed with non-unicast information, or Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for $T_f$=16 us. $T_f$ includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

Figure 8:
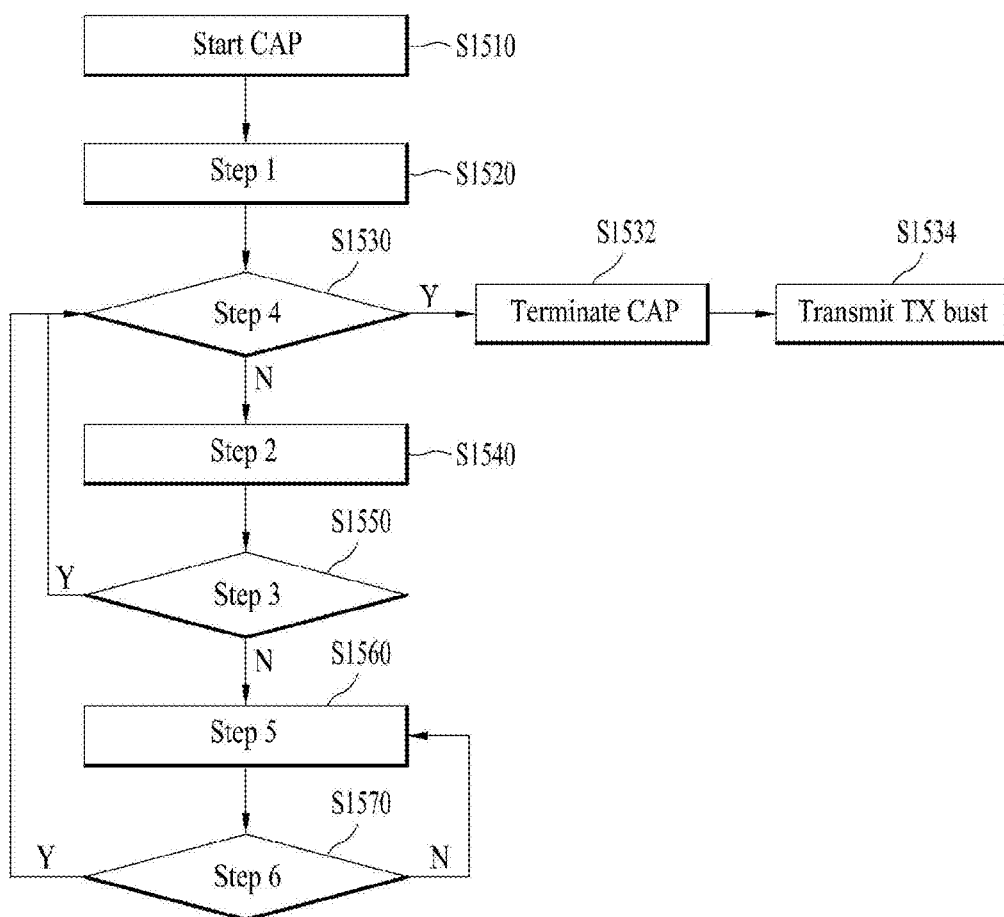

FIG. 8 is a flowchart illustrating CAP operations performed by a UE to transmit a UL signal.

Referring to FIG. 8, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration $T_d$ or all the slots of the additional defer duration $T_d$ are detected to be idle.

Step 6) (S1570) If the channel is sensed to be idle for all the slot durations of the additional defer duration $T_d$ (Y), step 4 proceeds. Otherwise (N), step 5 proceeds.

Table 6 shows that $m_p$, a minimum CW, a maximum CW, an MCOT, and an allowed CW size, which are applied to the CAP, vary depending on channel access priority classes.

TABLE 6

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$. In the Type 2A UL CAP, $T_f$ includes a sensing slot at the beginning thereof. In the Type 2B UL CAP, the UE may perform transmission immediately after the channel is sensed to be idle for the sensing duration $T_f$=16 us. In the Type 2B UL CAP, $T_f$ includes a sensing slot within 9 us from the end of the duration. In the Type 2C UL CAP, the UE does not perform channel sensing before performing transmission.

RB Interlace

Figure 9:
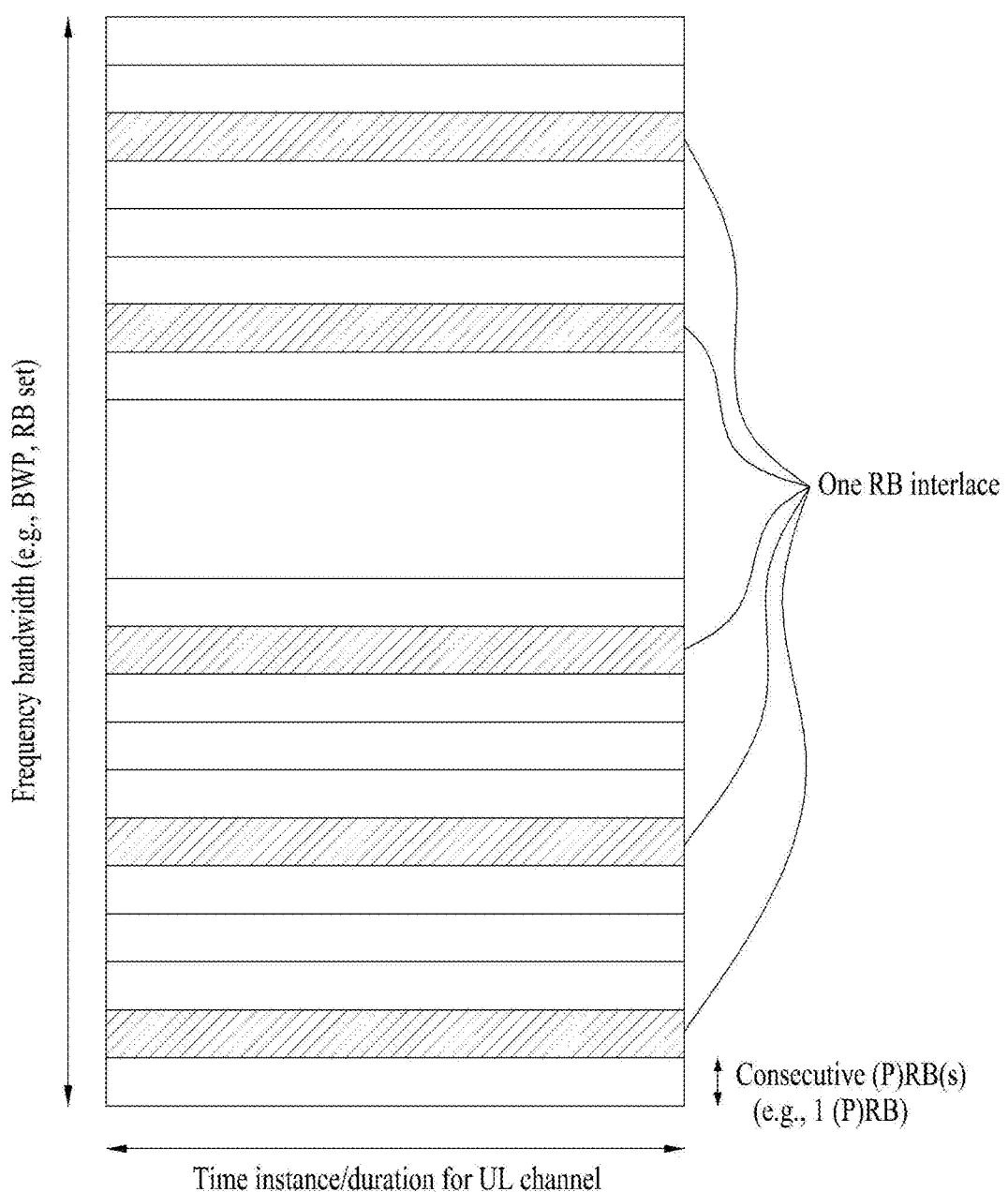
FIG. 9 illustrates a resource block (RB) interlace.

FIG. 9 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 9, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, ... , M−1} may consist of (common) RBs {m, M+m, 2M+m, 3M+m, ... }, where M represents the number of interlaces. A transmitter (e.g., UE) may use one or more interlaces to transmit a signal/channel. The signal/channel may include a PUCCH or PUSCH.

3. PUCCH Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH preamble design methods to be described later may be related to UL transmission, and thus, the methods may be equally applied to the above-described UL signal transmission methods in U-band systems. To implement the technical idea of the present disclosure in the corresponding systems, the terms, expressions, and structures in this document may be modified to be suitable for the systems.

For example, UL transmission based on the following PUCCH transmission methods may be performed on an L-cell and/or U-cell defined in the U-band systems.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

In this document, the term 'U-band' may be interchangeably used with the term 'shared spectrum'.

In the conventional NR system, five PUCCH formats are configured from PUCCH format 0 to PUCCH format 4 as shown in Table 4 above. PUCCH formats 0, 1, and 4 are configured to occupy a single PRB, and PUCCH formats 2 and 3 are configured to occupy 1 to 16 PRBs over OFDM symbols.

Hereinafter, PUCCH formats used in a shared spectrum will be described. When a specific device (and/or node) transmits a signal in the shared spectrum, there may be PSD restrictions. For example, according to the European Telecommunications Standards Institute (ETSI) regulation, signal transmission in a specific band needs to satisfy a PSD of 10 dBm/1 MHz. When the SCS is 15 kHz, if a PUCCH is transmitted with PUCCH format 0 (one PRB and 180 kHz), the maximum allowable power for the PUCCH may be about 10 dBm. In general, the maximum power of the UE is 23 dBm, and the maximum allowable power of 10 dBm is significantly lower than 23 dBm. If the UE transmits a UL signal at 10 dBm, the maximum UL coverage supported by the UE may be reduced. If the UE transmits a PUCCH in a wide frequency domain (F-domain) to increase the transmit power, it may help to solve the problem that the UL coverage is reduced. As regulations in the shared spectrum, there may be OCB restrictions. For example, when a specific device transmits a signal, the signal may need to occupy at least 80% of the system bandwidth. If the system bandwidth is 20 MHz, the signal transmitted by the specific device may need to occupy more than 16 MHz, which is 80% of 20 MHz.

As a PUCCH structure in consideration of the PSD and OCB regulations, the above-described RB interlace structure may be used. For example, if a PUCCH sequence of the conventional PUCCH configured to use one PRB as in PUCCH format 0 and/or 1 is repeated over PRBs spaced at specific intervals in the frequency domain in consideration of the OCB, a PUCCH may be configured. If the PUCCH is transmitted in an RB interlace, the same PUCCH sequence may be repeatedly transmitted. The repeated transmission may increase a peak to average power ratio (PAPR) value and a cube metric (CM) value. However, the lower the PAPR and CM values, the better the transmission performance. Accordingly, methods of selecting a cyclic shift (CS) value and/or a phase shift (PS) value of a PUCCH sequence for each repetition in consideration of the PAPR and CM when a PUCCH is transmitted in an RB interlace in the frequency domain will be proposed.

The methods proposed in the present disclosure may be applied to other use cases as well as the NR U-band. For example, the methods proposed in the present disclosure may be used for an NR-based non-terrestrial network (NTN).

3.1. Embodiment 1

According to Embodiment 1, when PUCCH sequences are transmitted in PRBs, starting CS values to be applied to the PUCCH sequences may be set different from each other. Hereinafter, a PUCCH sequence may be simply referred to as a sequence. A starting CS value may be denoted by CS_start.

Specifically, a single PUCCH signal may be configured with a plurality of PUCCH sequences. The plurality of PUCCH sequences may repeatedly mapped and/or transmitted over a plurality of PRBs included in one interlace. For example, when there are a plurality of PRBs included in one interlace, one individual/independent PUCCH sequence may be mapped to and/or transmitted in each PRB. A CS value applied to each sequence may be configured to have a different value for each PRB.

The CS may be set and/or applied to different values by applying a PS to each element/sample, which is included in one (frequency-domain) sequence, and/or subcarriers to which the element/sample is mapped. For example, if CS=a is multiplied by a set of L elements/samples included in a length-L sequence, {s_0, s_1, s_(L−1)}, the sequence to which the CS is applied may be represented by {$e^{j*0*a}$*s_0, $e^{j*1*a}$*s_1, ... , $e^{j*(L-1)*a}$*s_(L−1)}

As an example, considering transmission of 2-bit UCI on PUCCH format 0 (PF0) (simply referred to as 2-bit UCI on PF0), the 2-bit UCI may be represented by four CS values: CS_start, CS_start+3, CS_start+6, and CS_start+9. In this case, a different CS_start value may be applied to each PRB (or sequence). For example, the CS_start value may be determined as a function of PRB indices (in the PUCCH) included in a PUCCH resource. A PRB index, which is an input value for determining the CS_start value, may be referred to as a logical PRB index. In addition, the CS_start value may be configured to have a specific pattern for each PRB (or sequence). Hereinafter, the PRB index may be interchangeably used with the logical PRB index.

As another example, considering transmission of 2-bit UCI on PUCCH format 1 (PF1) (simply referred to as 2-bit UCI on PF1), a CS value corresponding to CS_start may be applied to sequences mapped to both a UCI symbol and a DMRS symbol. In this case, the CS_start value may vary for each PRB (or sequence). For example, the CS_start value may be determined as a function of PRB indices (in the PUCCH) included in a PUCCH resource. In addition, the CS_start value may be configured to have a specific pattern for each PRB (or sequence). In this case, the 2-bit UCI may be mapped to the UCI symbol based on quadrature phase shift keying (QPSK).

There may be a pre-given/configured CS value in generating the PUCCH sequences of PF0 and PF1. The pre-given/configured CS value may be for inter-cell interference randomization. When the pre-given and/or configured CS value is assumed to be CS=a, a CS (or CS_start) value determined according to each embodiment may be additionally applied to a sequence obtained by applying CS=a.

Figure 10:
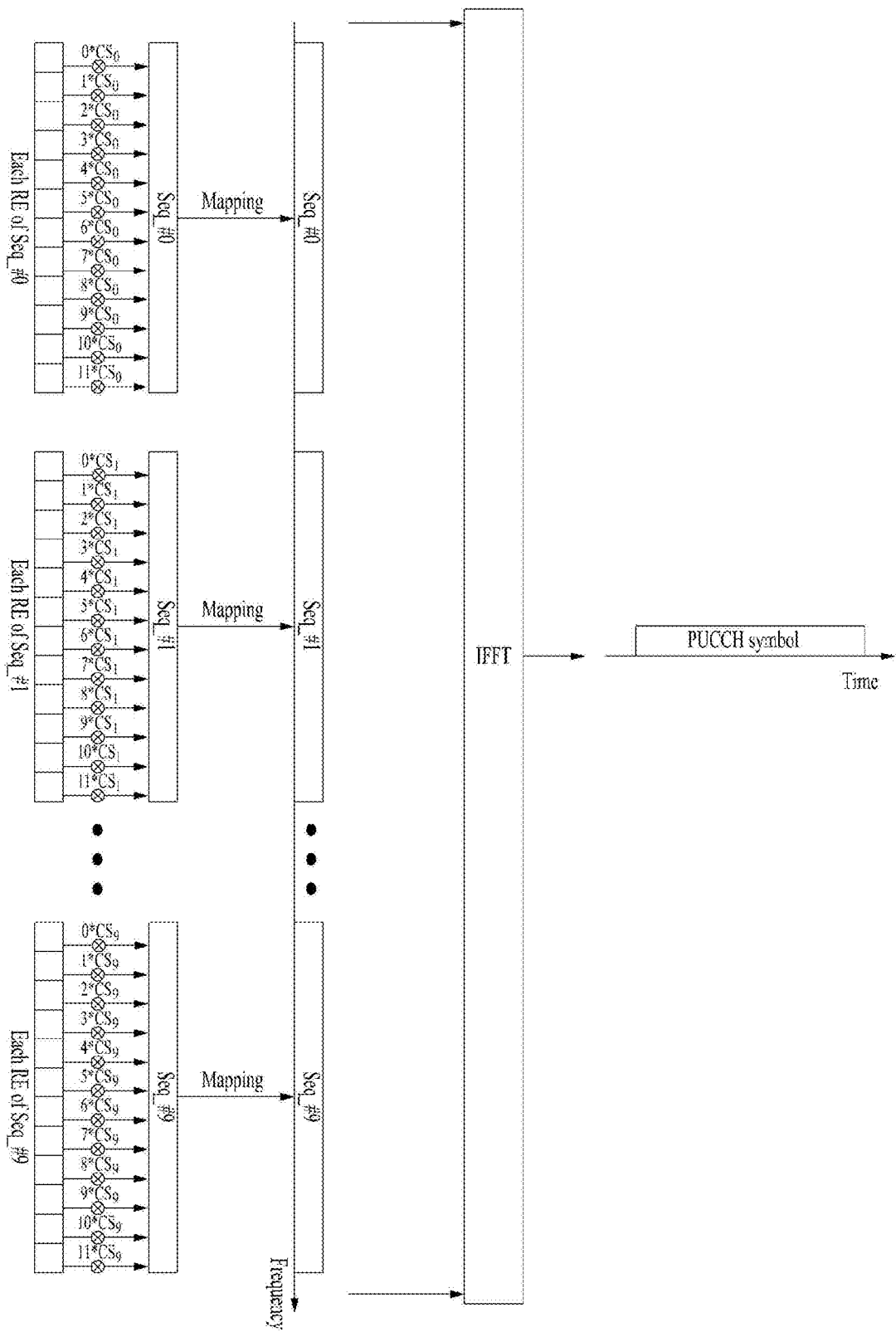

As described above, when a different (starting) CS value is applied to a PUCCH sequence, the PUCCH sequence with the different CS value may be mapped to each PRB, thereby having an advantage in terms of PAPR and/or CM performance. The method described in Embodiment 1 may be represented as shown in FIG. 10 if there are 10 PRBs and the length of each sequence is 12.

For example, when the method of applying a different CS to each PRB is reflected in the sequence generation equations for PF0 and PF1, it may be represented as follows.

(1) PF0

A base sequence for PF0 is defined according to Equation 1.

$$x(l \cdot N_{SC}^{RB}+n)=r_{u,v}^{(\alpha,\delta)}(n) \quad \text{[Equation 1]}$$

In Equation 1, n denotes the length of a PUCCH sequence and is defined by $n=0,1, \ldots, N_{SC}^{RB}-1$. In the conventional NR system, since PF0 is transmitted in one RB, $N_{SC}^{RB}=12$ is satisfied. On the other hand, in NR-U, PF0 may be transmitted over a plurality of PRBs. Thus, when PF0 is transmitted in NR-U, the method of applying a different CS to each PRB may be represented by Equation 2.

$$x(RB_i,l \cdot N_{SC}^{RB}+n)=r_{u,v}^{(\alpha_i,\delta)} \quad \text{[Equation 2]}$$

In Equation 2, i denotes a PRB index and is defined by $i=0, 1, \ldots, N_{PUCCH}^{RB}-1$. $N_{PUCCH}^{RB}$ denotes the total number of PRBs for (repeatedly) transmitting the corresponding PUCCH. In this case, $\alpha_i$ indicating the CS may vary depending on the PRB index.

(2) PF1

A base sequence for PF0 is defined according to Equations 3 and 4.

$$y(n)=d(0) \cdot r_{u,v}^{(\alpha,\delta)}(n) \quad \text{[Equation 3]}$$

$$z(m'N_{SC}^{RB}N_{SF,0}^{PUCCH,1}+mN_{SC}^{RB}+n)=w_i(n) \cdot y(n) \quad \text{[Equation 4]}$$

Similarly to PF0, n is the length of a PUCCH sequence and defined by $n=0, 1, \ldots, N_{PUCCH}^{RB}-1$. In the conventional NR system, since PF0 is transmitted in one RB, $N_{SC}^{RB}=12$ is satisfied. On the other hand, in NR-U, PF0 may be transmitted over a plurality of PRBs. Thus, when PF1 is transmitted in NR-U, the method of applying a different CS to each PRB may be represented by Equations 5 and 6.

$$y(RB_i,n)=d(0) \cdot r_{u,v}^{(\alpha_i,\delta)}(n) \quad \text{[Equation 5]}$$

$$z(RB_i,m'N_{SC}^{RB}N_{SF,0}^{PUCCH,1}+mN_{SC}^{RB}+n)=w_i(RB_i,n) \cdot y(RB_i,n) \quad \text{[Equation 6]}$$

In Equations 5 and 6, i denotes a PRB index and is defined by $i=0, 1, \ldots, N_{PUCCH}^{RB}-1$. $N_{PUCCH}^{RB}$ denotes the total number of PRBs for (repeatedly) transmitting the corresponding PUCCH. In this case, $\alpha_i$, indicating the CS may vary depending on the PRB index.

Hereinafter, Embodiment 1 will be described in more detail.

Embodiment 1-1

A starting CS value applied to a PUCCH sequence to be repeatedly transmitted in each of a plurality of PRBs included in one interlace may be configured to have a different value for each PRB group.

According to Embodiment 1-1, PRBs included in one interlace may be divided into two or more groups.

As an example, when one interlace includes two groups, the two groups may be defined as follows: a PRB group of even numbered PRBs and a PRB group of odd numbered PRBs. The PRB group of even numbered PRBs may include PRBs with PRB indices 0, 2, 4, . . . , and the PRB group of odd numbered PRBs may include PRBs with PRB indices 1, 3, 5, . . . . The CS_start value to be applied to the PRB group of even numbered PRBs may be X, and the CS_start value to be applied to the PRB group of odd numbered PRBs may be Y, where X and Y have different values. For example, X=0 and Y=1.

As another example, one interlace may include three groups. A first group may be composed of PRBs with PRB indices 0, 3, 6, and 9. A second group may be composed of PRBs with PRB indices 1, 4, and 7 or 1, 4, 7, and 10. A third group may be composed of PRBs with PRB indices 2, 5, and 8. The CS_start values to be applied to the first, second, and third groups may be X, Y, and Z, respectively, where X, Y and Z have different values. For example, X=0, Y=1, and Z=2.

The starting CS value may be indicated by the BS to the UE through higher layer signaling. Alternatively, the starting CS value may be preconfigured between the BS and UE.

For example, two PRB groups may be defined as follows: a PRB group of odd numbered PRBs and a PRB group of even numbered PRBs. The CS_start value to be applied to the PRB group of even numbered PRBs may be X, and the CS_start value to be applied to the PRB group of odd numbered PRBs may be Y. In this case, initialcyclicshift_evennumberedPRB and initialcyclicshift_oddnumberedPRB may be introduced into RRC parameters PUCCH-format0 and PUCCH-format1, and the CS_start value may be indicated by the corresponding parameters. For example, the BS may inform the UE of initialcyclicshift_evennumberedPRB=0 and initialcyclicshift_oddnumberedPRB=1 to indicate the values of X and Y, respectively.

Table 7 shows PAPRs and CMs measured while changing the starting CS value according to Embodiment 1-1 for an interlace composed of 10 PRBs.

TABLE 7

| Starting CS value for each PRB | PAPR (dB) | CM (dB) |
|---|---|---|
| [0, 0, 0, 0, 0, 0, 0, 0, 0, 0] | 8.675 | 10.062 |
| [0, 1, 0, 1, 0, 1, 0, 1, 0, 1] | 7.6001 | 8.218 |
| [0, 1, 2, 0, 1, 2, 0, 1, 2, 0] | 6.7929 | 7.286 |
| [0, 1, 2, 3, 4, 0, 1, 2, 3, 4] | 5.6803 | 5.057 |

Embodiment 1-2

A starting CS value applied to a PUCCH sequence to be repeatedly transmitted in each of a plurality of PRBs included in one interlace may be configured to sequentially increase or decrease by the value of X according to the PRB index. In this document, X may be expressed as Δ.

The X value may be set smaller than or equal to the sequence length.

PRB indices may be determined based on the frequency positions of PRBs included in an interlace. In other words, the PRB indices may be determined as logical PRB indices. For example, among PRBs included in one interlace, a PRB at the lowest position in the frequency domain may have PRB index 0, and a PRB at the second lowest position in the frequency domain may have PRB index 1. That is, indexing may be sequentially performed up to a PRB at the highest position in the frequency domain.

A CS value calculated based on the X value and the PRB index may be greater than the sequence length L. An actual CS value may be configured by wrapping around the calculated CS value with respect to the sequence length so that the CS value is smaller than the sequence length L. Here, wrapping around may be equivalent to the modulo or modular operation. For example, the actual CS value may be obtained by applying the modulo operation to the calculated CS value.

Tables 8 to 10 show examples in which the starting CS value is obtained by (X*i) modulo L operation when the PRB index is i and the sequence length is L. For example, when X=5, i=4, and L=12, the starting CS value becomes (5*4) modulo 12=8. X*i may be denoted by mint.

Table 8 shows the starting CS value for each PRB index when X=1.

TABLE 8

| | PRB index | | | | | | | | | | |
|---|---|---|---|---|---|---|---|---|---|---|---|
| | 0 | 1 | 2 | 3 | 4 | 5 | 6 | 7 | 8 | 9 | (10) |
| Starting CS value | 0 | 1 | 2 | 3 | 4 | 5 | 6 | 7 | 8 | 9 | 10 |

Table 9 shows the starting CS value for each PRB index when X=5.

TABLE 9

| | PRB index | | | | | | | | | | |
|---|---|---|---|---|---|---|---|---|---|---|---|
| | 0 | 1 | 2 | 3 | 4 | 5 | 6 | 7 | 8 | 9 | (10) |
| Starting CS value | 0 | 5 | 10 | 3 | 8 | 1 | 6 | 11 | 4 | 9 | 2 |

Table 10 shows the starting CS value for each PRB index when X=2.

TABLE 10

| | PRB index | | | | | | | | | | |
|---|---|---|---|---|---|---|---|---|---|---|---|
| | 0 | 1 | 2 | 3 | 4 | 5 | 6 | 7 | 8 | 9 | (10) |
| Starting CS value | 0 | 2 | 4 | 6 | 8 | 10 | 0 | 2 | 4 | 6 | 8 |

The starting CS value may be indicated by the BS to the UE through higher layer signaling. In addition, the starting CS value may be preconfigured between the UE and BS.

When the X value and the sequence length L are coprime numbers, different CS values may be applied to the PUCCH sequence to be repeatedly transmitted in each PRB, thereby having an advantage in terms of PAPR and/or CM performance. Table 11 shows PAPR and CM values depending on X values when one interlace consists of 10 PRBs. Referring to Table 11, it may be seen that the PARR and CM values are the best when X=5.

TABLE 11

| X | Starting CS value for each PRB | PAPR (dB) | CM (dB) |
|---|---|---|---|
| 0 | [0, 0, 0, 0, 0, 0, 0, 0, 0, 0] | 8.675 | 10.062 |
| 1 | [0, 1, 2, 3, 4, 5, 6, 7, 8, 9] | 3.5401 | 1.569 |
| 5 | [0, 5, 10, 3, 8, 1, 6, 11, 4, 9] | 3.5708 | 1.488 |
| 2 | [0, 2, 4, 6, 8, 10, 0, 2, 4, 6] | 4.9783 | 3.461 |

The CS value $\alpha_i$ applied to the conventional PUCCH sequence is derived by Equation 7 below.

[Equation 7]

$$\alpha_i = \frac{2\pi}{N_{SC}^{RB}}((m_0 + m_{cs} + n_{cs}(n_{s,f}^\mu, l+l')) \bmod N_{SC}^{RB})$$

In Equation 7, $n_{s,f}^\mu$ denotes a slot index in a radio frame for the PUCCH transmission. In addition, l denotes a symbol index for the PUCCH transmission on the assumption that the first OFDM symbol index for the PUCCH transmission is 0, and l' denotes a first OFDM symbol index for the PUCCH transmission in a slot. Thus, $n_{cs}$ may be determined based on time resources allocated to the PUCCH. In addition, $m_0$ is a PRB offset determined based on RRC parameters, and $m_{cs}$ is a value determined based on a combination of the PUCCH format, the type of SR information to be transmitted, and HARQ information. $N_{SC}^{RB}$ denotes the number of subcarriers in each RB and may be 12 as described above. Herein, a subcarrier may be referred to as an RE. The sequence length may not exceed the number of REs allocated for the PUCCH transmission. In this specification, the expression of 'the PUCCH sequence is mapped to the PRB' or 'the PUCCH sequence uses one PRB' may mean that the PUCCH sequence length L is 12.

Equation 8 shows that the starting CS value sequentially increases by the value of X according to the PRB index based on Embodiment 1-2.

[Equation 8]

$$\alpha_i = \frac{2\pi}{N_{SC}^{RB}}((m_0 + m_{cs} + m_{int} + n_{cs}(n_{s,f}^\mu, l+l')) \bmod N_{SC}^{RB})$$

According to Equation 8, since the value of $m_{int}$ is X*i, the starting CS value may be obtained by the modulo operation between the sequence length L and values obtained by adding the value of $m_{int}$ to the values used for conventional PUCCH transmission.

3.2. Embodiment 2

According to Embodiment 2, a different PS value may be multiplied by a PUCCH sequence for each PRB included in an interlace.

Specifically, a single PUCCH signal may be configured with a plurality of PUCCH sequences. The plurality of PUCCH sequences may be repeatedly mapped and/or transmitted over a plurality of PRBs included in one interlace. For example, when there are a plurality of PRBs included in one interlace, one individual/independent PUCCH sequence may be mapped to and/or transmitted in each PRB. A PS value applied to each sequence may be configured to have a different value for each PRB. The (starting) CS value applied to each sequence may be set to the same value among PRBs (or sequences).

The same PS value may be multiplied with each element/sample, which is included in one (frequency-domain) sequence, and/or subcarriers to which the element/sample is mapped. For example, if PS=a is multiplied by a set of L elements/samples included in a length-L sequence, $\{s\_0, s\_1, \ldots, s\_(L-1)\}$, the sequence to which the PS is applied may be represented by $\{e_{j*a}*s\_0, e_{j*a}*s\_1, \ldots, e^{j*a}*s\_(L-1)\}$.

As an example, considering 2-bit UCI on PF0, a different PS value may be multiplied by the PUCCH sequence for each PRB. The same CS values of 0, 3, 6, and 9 may be applied to the PUCCH sequence for each PRB. The different PS value may be 1, 1i, −1, or −1i. In this case, the PS value may be configured to vary for each PRB (or sequence). For example, the PS value may be determined as a function of PRB indices (in the PUCCH) included in a PUCCH resource. A PRB index, which is an input value for determining the PS value, may be referred to as a logical PRB index. In addition, the PS value may be configured to have a specific pattern for each PRB (or sequence).

As another example, considering 2-bit UCI on PF1, different PS values may be multiplied by sequences mapped to a UCI symbol and a DMRS symbol for each PRB. The same CS value may be applied to the PUCCH sequence for each PRB. In this case, the PS value may be configured to vary for each PRB (or sequence). For example, the PS value may be determined as a function of PRB indices (in the PUCCH) included in a PUCCH resource. In addition, the PS value may be configured to have a specific pattern for each PRB (or sequence).

Figure 11:
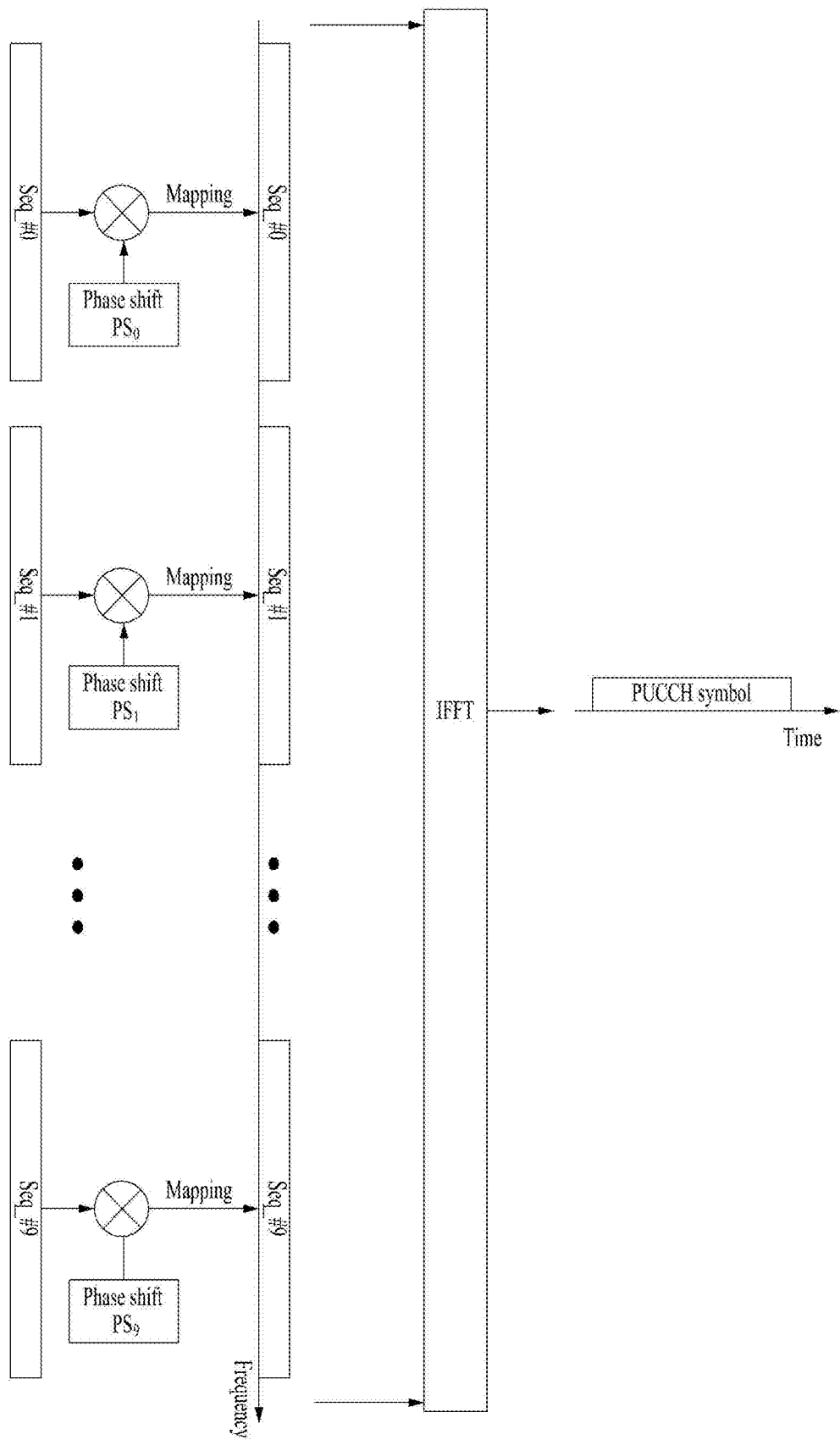

As described above, when a different PS value is multiplied by a PUCCH sequence, the PUCCH sequence with the different PS value may be mapped to each PRB, thereby having an advantage in terms of PAPR and/or CM performance. In Embodiment 1, the CS is implemented in the frequency domain, and the PS value that gradually increases according to the RE index is reflected as the PS of each RE in the same PRB. On the other hand, according to Embodiment 2, the same PS value is applied to each RE in the same PRB. The method described in Embodiment 2 may be represented as shown in FIG. 11 if there are 10 PRBs.

Hereinafter, Embodiment 2 will be described in more detail.

Embodiment 2-1

A PS value to be multiplied by a PUCCH sequence to be repeatedly transmitted in each of a plurality of PRBs included in one interlace may be configured to have a specific pattern so that the PS value varies for each PRB.

The specific PS pattern may be set to values obtained from an experiment using four PS values of 1, 1i, −1, and −1i.

FIG. 12 illustrates the results of testing PAPR and CM performance by fixing the phase of the first PRB to 1 (i.e., 0°) and applying all four PS values of 1, 1i, −1, −1i (i.e., 0°, 90°, 180°, and 270°) to the remaining 9 PRBs in an interlace structure composed of 10 PRBs. Specifically, FIG. 12 shows combinations of top 20 PS values based on the CM performance. The 20 combinations shown in FIG. 12 may be considered as the PS value pattern of Embodiment 2.

FIG. 13 illustrates the results of testing PAPR and CM performance by fixing the phase of the first PRB to 1 (i.e., 0°) and applying all four PS values of 1, 1i, −1, −1i (i.e., 0°, 90°, 180°, and 270°) to the remaining 10 PRBs in an interlace structure composed of 11 PRBs. Specifically, FIG. 13 shows combinations of top 20 PS values based on the CM performance. The 20 combinations shown in FIG. 13 may be considered as the PS value pattern of Embodiment 2.

Particularly, top four PS value patterns show superior PAPR and CM performance than the other 16 PS value patterns. Accordingly, in FIG. 13, indices 43171, 532523, 421477, and 976621 may be considered as PS combinations to be used in the interlace structure composed of 11 PRBs.

3.3. Embodiment 3

According to Embodiment 3, different UCI bit-to-constellation mapping may be applied to each PRB.

Specifically, a single PUCCH signal may be configured with a plurality of PUCCH sequences. The plurality of PUCCH sequences may repeatedly mapped and/or transmitted over a plurality of PRBs included in one interlace. For example, when there are a plurality of PRBs included in one interlace, one individual/independent PUCCH sequence may be mapped to and/or transmitted in each PRB. Different UCI bit-to-constellation mapping may be configured and/or applied for each PRB. The same (starting) CS value and/or PS value may be applied to each PRB (or sequence).

As an example, considering 2-bit UCI on PF0, different constellation mapping may be applied to each PUCCH sequence repeatedly mapped to and/or repeatedly transmitted in each of a plurality of PRBs included in one interlace while maintaining Gray coding for a bit set of {00, 01, 11, 10} as follows: CS set 1={0+a, 3+a, 6+a, 9+a} and CS set 2={9+a, 6+a, 3+a, 0+a}, where a may be one of 0, 3, 6, and 9. Due to the constellation mapping, different CS sets and/or different values of a may be applied to each PRB. Gray coding refers to a coding scheme in which only one digit changes in adjacent digits when a value changes. For example, the number of cases representable by an n-bit binary Gray code may be $2^n$, and a binary Gray code may be represented differently $2_n$ times.

As another example, considering 2-bit UCI on PF1, different constellation mapping may be applied to QPSK mapping on UCI symbols for each PRB while maintaining Gray coding for a bit set of {00, 01, 11, 10} as follows: PS set 1={1, 1i, −1, −1i}*b and PS set 2={−1i, −1, 1i, 1}*b, where b may be one of 1, 1i, −1, and −1i. Due to the constellation mapping, different PS sets and/or different values of b may be applied to each PRB. In addition, a PS may be applied to a DMRS sequence in accordance with the constellation mapping change in the UCI symbols. For example, a phase value to be applied to the DMRS sequence may be a phase value mapped to a specific bit in the UCI symbols. The specific bit may be, for example, bit 00.

According to Embodiment 3, since Gray coding is always maintained, PUCCH transmission performance may be guaranteed.

3.4. Embodiment 4

According to Embodiment 4, Embodiment 1 and Embodiment 2 may be combined.

Specifically, according to Embodiment 1, a different CS value may be applied to each PRB, and according to Embodiment 2, a different PS value may be applied to each PRB. The number of different sequences generated by combining Embodiments 1 and 2 is much larger than the number of different sequences (to be respectively mapped to PRBs) generated by either only Embodiment 1 or Embodiment 2. Therefore, lower PAPR/CM values (better in terms of performance) may be obtained by combining Embodiments 1 and 2.

A single PUCCH signal may be configured with a plurality of PUCCH sequences. The plurality of PUCCH sequences may repeatedly mapped and/or transmitted over a plurality of PRBs included in one interlace. For example, when there are a plurality of PRBs included in one interlace, one individual/independent PUCCH sequence may be mapped to and/or transmitted in each PRB. A CS value applied to each sequence may be configured to have a different value for each PRB. In addition, a PS value applied to each sequence may configured to have a different value for each PRB.

As an example, considering 2-bit UCI on PF0, two bits may be represented by four CS values: CS_start, CS_start+3, CS_start+6, and CS_start+9 as described in Embodiment 1. In this case, a different CS_start value may be applied to each PRB (or sequence), and at the same time, a different PS value (e.g. 1, 1i, −1, or −1i) may be multiplied by each PRB (or sequence) to map and/or transmit a PUCCH.

As another example, considering 2-bit UCI on PF1, a CS value corresponding to CS_start may be to sequences mapped to both a UCI symbol and a DMRS symbol as described in Embodiment 1. In this case, a different CS_start value may be applied to each PRB (or sequence), and at the same time, a different PS value (e.g. 1, 1i, —1, or −1i) may be multiplied by each PRB (or sequence) to map and/or transmit a PUCCH.

Figure 14:
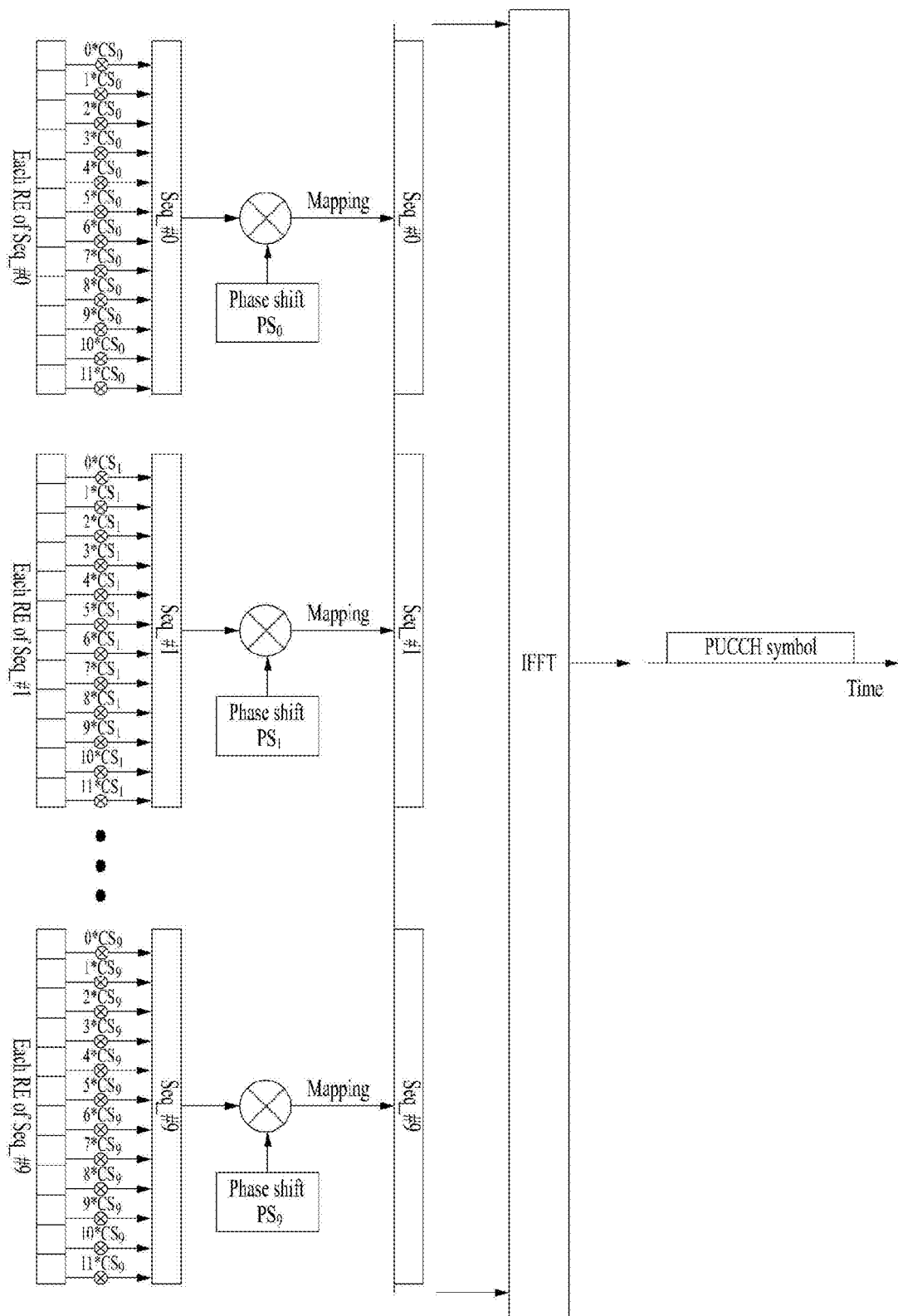

The method of applying combinations of different CS values and different PS values to a plurality of PRBs (or sequences) has an advantage in terms of PAPR and/or CM performance, compared to the method of Embodiment 1 or 2 in which only CS values or PS values are used. FIG. 14 is a diagram illustrating Embodiment 4 when there are 10 PRBs and the length of each sequence is 12.

Hereinafter, Embodiment 4 will be described in more detail.

Embodiment 4-1

A (starting) CS value applied to a PUCCH sequence to be repeatedly transmitted in each of a plurality of PRBs included in one interlace may be configured to have a different value for each PRB group. Additionally, a PS value to be multiplied by the PUCCH sequence to be mapped to and/or transmitted in each PRB may be configured to have a specific pattern so that the PS value varies for each PRB. In other words, Embodiment 1-1 and Embodiment 2-1 may be combined. Each PRB may be identified by the logical PRB index described above.

According to Embodiment 4-1, PRBs included in one interlace may be divided into two or more groups.

The starting CS value may be indicated by the BS to the UE through higher layer signaling. In addition, the starting CS value may be preconfigured between the UE and BS.

The specific PS pattern may be set to values obtained from an experiment using four PS values of 1, 1i, −1, and −1i.

[Experiment 1] In an interlace structure composed of 10 PRBs, a starting CS value for each PRB is configured according to a previously proposed pattern (e.g., [0, 1, 0, 1, 0, 1, 0, 1, 0, 1]). Thereafter, PAPR and CM performance are tested by fixing the phase of the first PRB to 1 (i.e., 0°) and applying all four PS values of [1, 1i, −1, −1i] (i.e., 0°, 90°, 180°, 270°) to the remaining 9 PRBs. The first PRB is a PRB with the lowest logical PRB index, i.e., a PRB at the lowest position in the frequency band. FIG. 15 illustrates combination of top 20 PS values with respect to the CM performance based on the test results of Experiment 1.

Referring to the results of FIG. 15, it may be seen that the PAPR and CM performance are improved compared to when only the CS values are set to 0, 1, 0, 1, 0, 1, 0, 1, 0, and 1 and no PS values are applied. In addition, it may also be seen that the PAPR and CM performance are improved compared to when only PS values are applied (in Embodiment 1, the PAPR is about 7.60001 dB and the CM is about 8.218 dB, and in Embodiment 2-1, the PAPR is about 3.567 dB and the CM is about 1.663 dB).

[Experiment 2] In an interlace structure composed of 11 PRBs, a starting CS value for each PRB is configured according to a previously proposed pattern (e.g., [0, 1, 0, 1, 0, 1, 0, 1, 0, 1]). Thereafter, PAPR and CM performance are tested by fixing the phase of the first PRB to 1 (i.e., 0°) and applying all four PS values of [1, 1i, −1, −1i] (i.e., 0°, 90°, 180°, 270°) to the remaining 9 PRBs. The first PRB is a PRB with the lowest logical PRB index, i.e., a PRB at the lowest position in the frequency band. FIG. 16 illustrates combination of top 20 PS values with respect to the CM performance based on the test results of Experiment 2.

According to Embodiment 4, the 40 PS combinations obtained from the results of Experiment 1 and Experiment 2 may be considered when mapping and/or transmitting a single PUCCH signal in an interlace composed of 10 or 11 PRBs.

Embodiment 4-2

A (starting) CS value applied to a PUCCH sequence to be repeatedly transmitted in each of a plurality of PRBs included in one interlace may be configured to sequentially increase or decrease by the value of X according to the PRB index. Additionally, a PS value to be multiplied by the PUCCH sequence to be mapped to and/or transmitted in each PRB may be configured to have a specific pattern so that the PS value varies for each PRB. In other words, Embodiment 1-2 and Embodiment 2-1 may be combined.

The X value may be set smaller than or equal to the sequence length.

Each PRB may be identified by the logical PRB index described above.

A CS value calculated based on the X value and the PRB index may be greater than the sequence length L. An actual CS value may be configured by wrapping around the calculated CS value with respect to the sequence length so that the CS value is smaller than the sequence length L.

The starting CS value may be indicated by the BS to the UE through higher layer signaling. In addition, the starting CS value may be preconfigured between the UE and BS.

The specific PS pattern may be set to values obtained from an experiment using four PS values of 1, 1i, −1, and −1i.

[Experiment 1] In an interlace structure composed of 10 PRBs, a starting CS value for each PRB is configured according to a previously proposed pattern (e.g., [0, 1, 2, 3, 4, 5, 6, 7, 8, 9, 10]). Thereafter, PAPR and CM performance are tested by fixing the phase of the first PRB to 1 (i.e., 0°) and applying all four PS values of [1, 1i, −1, −1i] (i.e., 0°, 90°, 180°, 270°) to the remaining 9 PRBs. The first PRB is a PRB with the lowest logical PRB index, i.e., a PRB at the lowest position in the frequency band. FIG. 17 illustrates combination of top 20 PS values with respect to the CM performance based on the test results of Experiment 1.

Referring to the results of FIG. 17, the top four results have superior performance compared to the rest of the results in terms of the PAPR/CM.

[Experiment 2] In an interlace structure composed of 11 PRBs, a starting CS value for each PRB is configured according to a previously proposed pattern (e.g., [0, 1, 2, 3, 4, 5, 6, 7, 8, 9, 10]). Thereafter, PAPR and CM performance are tested by fixing the phase of the first PRB to 1 (i.e., 0°) and applying all four PS values of [1, 1i, −1, −1i] (i.e., 0°, 90°, 180°, 270°) to the remaining 9 PRBs. The first PRB is a PRB with the lowest logical PRB index, i.e., a PRB at the lowest position in the frequency band. FIG. 16 illustrates combination of top 20 PS values with respect to the CM performance based on the test results of Experiment 2.

According to Embodiment 4, the 40 PS combinations obtained from the results of Experiment 1 and Experiment 2 may be considered when mapping and/or transmitting a single PUCCH signal to and/or in an interlace composed of 10 or 11 PRBs.

In particular, the top four combinations (i.e., indices 1, 111026, 139811, and 234388 in Experiment 1 and indices 1, 444103, 559241, and 937551 in Experiment 2) have the following characteristics. The top four combinations may be considered as representative combinations of CS and PS values in Embodiment 4-2.

Index 1 in Experiment 1 (index 1 in Experiment 2): This is a pattern to which no PS is applied.

Index 111026 in Experiment 1 (index 444103 in Experiment 2): The phase is shifted by 90° clockwise in the PRB order.

Index 139811 in Experiment 1 (index 559241 in Experiment 2): The phase is shifted by 180° clockwise (counterclockwise) in the PRB order.

Index 234388 in Experiment 1 (index 937551 in Experiment 2): The phase is shifted by 90° counterclockwise in the PRB order.

Therefore, when the CS is configured to increase by the value of X according to the PRB index (e.g., [0, 1, 2, 3, 4, 5, 6, 7, 8, 9, (10)]), the PS pattern may be configured to have PS values such that the phase increases by the value of Y according to the PRB index.

For example, if Y is Pi/2)(=90°, index 111026 in Experiment 1 (index 444103 in Experiment 2) may be configured and/or applied. If Y is Pi)(=180°, index 139811 in Experiment 1 (index 559241 in Experiment 2) may be configured and/or applied. If Y is −Pi/2)(=−90°, index 234388 in Experiment 1 (index 937551 in Experiment 2) may be configured and/or applied.

3.5 Embodiment 5

Embodiment 1 and Embodiment 3 may be combined. According to Embodiment 1, a different CS value may be applied to each PRB, and according to Embodiment 3, different UCI bit-to-constellation mapping may be applied to each PRB. Similarly to that described in Clause 3.4, the number of different sequences generated by combining Embodiments 1 and 3 is much larger than the number of different sequences (to be respectively mapped to PRBs) generated by only either Embodiment 1 or Embodiment 3. Therefore, lower PAPR/CM values (better in terms of performance) may be obtained by combining Embodiments 1 and 3.

That is, in addition to applying a different starting CS value to a PUCCH sequence repeatedly transmitted over a plurality of PRBs, different UCI bit-to-constellation mapping may also be applied to each PRB. The plurality of PRBs may be spaced apart by specific frequency intervals.

For example, for 2-bit UCI on PF0, a combination of CS_start values and constellations: CS={CS_start+a, CS_start+3+a, CS_start+6+a, CS_start+9+a} or {CS_start+9+a, CS_start+6+a, CS_start+3+a, CS_start+a} may be applied to each PUCCH sequence repeatedly transmitted in each PRB while maintaining Gray coding for a bit set of {00, 01, 11, 10}, where a may be one of 0, 3, 6, and 9.

3.6. Embodiment 6

Embodiment 2 and Embodiment 3 may be combined. According to Embodiment 2, a different PS value may be applied to each PRB, and according to Embodiment 3, different UCI bit-to-constellation mapping may be applied to each PRB. Similarly to Embodiments 4 and 5, the number of different sequences generated by combining Embodiments 2 and 3 is much larger than the number of different sequences (to be mapped to PRBs) generated by only either Embodiment 2 or Embodiment 3. Therefore, lower PAPR/CM values (better in terms of performance) may be obtained by combining Embodiments 2 and 3.

That is, in addition to multiplying a different PS value by a PUCCH sequence repeatedly transmitted over a plurality of PRBs, different UCI bit-to-constellation mapping may also be applied to each PRB. The plurality of PRBs may be spaced apart by specific frequency intervals.

For example, for 2-bit UCI on PF0, different constellation mapping: {0+a, 3+a, 6+a, 9+a} or {9+a, 6+a, 3+a, 0+a} may be applied to each PUCCH sequence repeatedly transmitted in each PRB while maintaining Gray coding for a bit set of {00, 01, 11, 10}. In addition, a different PS value may be multiplied to each PRB (or sequence). For PS values, the pattern proposed in Embodiment 2 or Embodiment 3 may be applied. Here, a may be one of 0, 3, 6, and 9.

Additional Embodiments Based on Embodiments 1 to 6

In a specific system, a combination of CS values and/or PS values may be selected and/or applied based on the results of the proposed embodiments (Embodiments 1 to 6). For example, when PUCCH format 0 of NR-U is used, each interlace (or interlace index) included in the PUCCH may consist of 10 or 11 RBs. A short sequence may be repeatedly transmitted in each of a plurality of RBs included in one interlace. The short sequence may be a length-12 computer generated sequence (CGS).

When a short sequence is repeatedly transmitted in an interlace composed of 10 RBs, Embodiment 1-2 may be applied. For example, in Embodiment 1-2, if X has a value of 1, a starting CS value applied to each RB/sequence may be set to 0, 1, 2, 3, 4, 5, 6, 7, 8, and 9 sequentially in order of RBs (in the PUCCH resource).

When a short sequence is repeatedly transmitted in an interlace composed of 11 RBs, Embodiment 2-1 may be applied. For example, based on the test results of Experiment 2 of Embodiment 2-1, the top four PS patterns may be sequentially applied in order of RBs (in the PUCCH resource). For example, assuming that index 421477 is applied, a PS value applied to each RB/sequence may be set to 1, 1i, −1, 1i, −1, −1i, −1, 1i, −1, 1i, and 1 sequentially in the RB order (in the PUCCH resource).

The method in Embodiment 6 may be applied not only to the PUCCH but also to UL, DL and/or sidelink channels and/or signals configured in the form of an interlace consisting of 10 or 11 RBs and/or sequences.

Additionally, the experiments of each embodiment are performed based on the 30 kHz SCS, but similar results may be obtained for other SCSs. Accordingly, each embodiment may be considered/applied regardless of SCSs. In addition, the experiments of each embodiment are mainly performed based on PUCCH format 0, but similar results may be obtained for other PUCCH formats as well. Accordingly, each embodiment may be applied to other PUCCH formats (e.g., PUCCH format 1, PUCCH format 4, etc.).

For example, when the 15 kHz SCS is used, the total number of PRBs may increase. However, when the PUCCH is actually transmitted, one interlace may consist of 10 or 11 PRBs. In other words, one interlace may be configured identically for both cases when the 15 kHz SCS is used and when the 30 kHz SCS is used. The interval between PRBs in one interlace may increase. Therefore, the proposed embodiments may be applied to other SCSs.

It may be further considered that additional information is loaded on the PS pattern proposed in Embodiment 2. Since the additional information is loaded on the PS pattern, this method may be used in Embodiments 4 and 6 where the PS pattern is used. Specifically, when specific N PS patterns are preconfigured and/or predefined, one of the N PS patterns may be selected and applied to a UL channel and/or signal. The UL channel and/or signal may be, for example, a PUCCH. The UL channel and/or signal may (additionally) include specific UCI with log2(N) bits. In addition, the UL channel and/or signal may (additionally) include specific UCI with ceil(log2(N)) or floor(log2(N)) bits. The specific N PS patterns may be PS patterns selected due to excellent PAPR/CM performance, for example, based on the above experiment results. As an example, HARQ-ACK information/bits may be transmitted based on CSs (or CS pattern) applied to a plurality of sequences constituting the PUCCH or QPSK/BPSK (binary phase shift keying) modulation symbols mapped to the sequences, and at the same time, SR information and/or bits may be transmitted based on PSs (or PS pattern) applied to the plurality of sequences constituting the corresponding PUCCH. The SR information and/or bits may be, for example, whether a transmitted SR is positive or negative. As another example, 2-bit information may be transmitted based on the top four PS patterns (see FIGS. 13, 17 and 18) in the experiments of the present disclosure. For example, according to Experiment 2 of Embodiment 2, the top four PS value patterns (i.e., indices 43171, 532523, 421477, and 976621 in Experiment 2) show superior PAPR/CM compared to other PS value patterns. Accordingly, the 2-bit information may be transmitted based on one or more of the four indices: indices 43171, 532523, 421477, and 976621. Further, in a specific cell, 1-bit information may be transmitted based on two of the top four indices, and in a cell adjacent to the specific cell, 1-bit information may be transmitted based on the remaining two indices. In this case, the additional information may be, for example, a positive/negative SR and/or ACK/NACK feedback.

Additionally, a PS and/or CS pattern with good PAPR/CM performance may be mapped to information that is expected to have a high transmission/reception frequency between the UE and the BS. For example, since the transmission/reception frequency of ACK is expected to be high in the case of the HARQ A/N and the transmission/reception frequency of negative SR is expected to be high in the case of the SR, the PS pattern with index 43171 and/or index 532523 showing the best performance among the results of Experiment 2 in Embodiment 2 may be used to transmit the ACK or negative SR.

As a specific example, the UE may be configured to transmit positive/negative SR information based on PS patterns as shown in Table 12.

TABLE 12

| Index | PS pattern | Information |
|---|---|---|
| 43171 | [1, 1, 1, −1, −1, −1, 1, −1, −1, 1, −1] | Positive SR |
| 532523 | [1, −1, 1, 1, −1, 1, 1, 1, −1, −1, −1] | Negative SR |

Hereinafter, a description will be given of how two different UEs transmit PUCCHs by applying the patterns shown in Table 12. It is assumed that PUCCH transmissions of two UEs (e.g., UE1 and UE2) are multiplexed on the same PUCCH resource. In addition, according to the configuration of the BS, UE1 represents ACK/NACK with (starting) CS values of 0 and 6, and UE2 represents ACK/NACK with (starting) CS values of 3 and 9. If UE1 transmits a positive SR and UE2 transmits a negative SR according to the example in Table 12, the PUCCH interlace structures shown in FIG. 19 may be configured for the two UEs.

Figure 19:
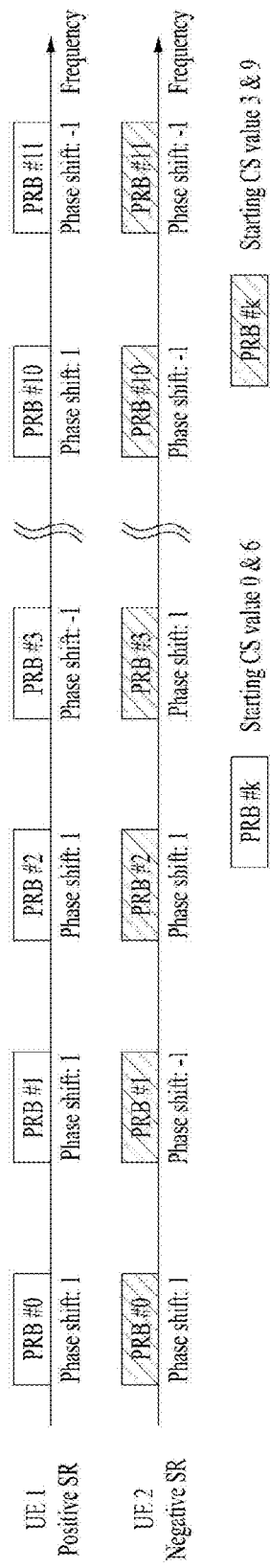

If UE1 and UE2 transmit the PUCCHs as shown in FIG. 19, the BS may know which (starting) CS values the UE1 and UE2 use to transmit the PUCCHs. The BS may perform detection based on sequences of the PUCCHs transmitted from UE1 and UE2. Thereafter, the BS may obtain PS pattern values used by UE1 and UE2, and thus, the BS may receive additional information (e.g., positive SR, negative SR, etc.).

When this method is applied, additional information may be exchanged in a new domain (i.e., PUCCH PS pattern), and thus reliability may be improved compared to when only constellations are used as in the prior art.

Hereinafter, a power offset configuration method based on Embodiments 1 to 6 will be described.

Even when different information is transmitted according to the proposed methods in which additional information (e.g., SR information, A/N information, etc.) is transmitted with a plurality of different CS patterns, the same CS value may be used in a specific PRB included in a corresponding interlace. The method of transmitting additional information with a plurality of different CS patterns is, for example, means that the additional information is transmitted by selecting and/or applying one of the plurality of CS patterns depending on whether the information is a negative SR or positive SR or whether the information is an ACK or NACK. For example, considering that SR information is transmitted with different CS patterns, when 2-bit A/N+SR are transmitted on PUCCH format 0 (which may be referred to as enhanced PUCCH format 0) proposed in this document, a CS value used for each PRB included in an interlace may be determined as shown in FIG. 20.

In FIG. 20, an initial CS value (e.g., M0+Mcs) for the 2-bit A/N is set to {0, 3, 6, 9}={NN, NA, AA, AN}. Embodiment 1-2 is used for the negative SR, and X is set to 1 (where X is the CS interval between contiguous PRBs). Embodiment 1-2 is used for the positive SR, and X is set to 7 (=1+6). In this case, 5 and 11 (=5+6) may be set instead of 1 and 7 (=1+6), and the order thereof may vary. It may be seen that the same CS value is always used in odd numbered PRB indices (i.e., PRB #1, #3, #5, #9) when NN+negative SR are transmitted (second column of FIG. 20) and when AA+positive SR are transmitted (seventh column of FIG. 20). Thus, a slot in which 2-bit A/N and SR are transmitted (2-bit A/N+SR slot) may have poor A/N performance compared a slot in which only 2-bit A/N is transmitted (2-bit A/N only slot).

When the method of transmitting additional information (e.g., SR information, A/N information, etc.) with a plurality of different CS patterns is used, if the same CS value is applied to PRBs included in an interlace to transmit different information, a transmission power offset may be used for corresponding PUCCH transmission. For example, when the same CS value is applied to half of the PRBs included in the interlace as shown in FIG. 20, the UE may be configured to use N dB (e.g., N=3) higher power in a slot in which 2-bit A/N and SR are transmitted together, compared to a slot in which only 2-bit A/N is transmitted. As another example, when second A/N is transmitted based on another CS pattern, power used for a 2-bit A/N only slot may be higher by N dB (e.g., N=3) than that used for an 1-bit A/N only slot.

This may be generalized as follows. When UCI is transmitted on a PUCCH, a PUCCH transmission power offset when one fixed CS pattern is applied may be set different from a PUCCH transmission power offset when a plurality of different CS patterns are applied (one of them is selected and applied). For example, the offset when the UCI is transmitted on the PUCCH by applying the plurality of different CS patterns may be higher by N dB (N>0) (e.g., N=3) than the offset when the UCI is transmitted on the PUCCH by applying the one fixed CS pattern.

Hereinafter, a method of transmitting second TB A/N information with different CS patterns is described.

It may be assumed that SR information is transmitted with a plurality of different CS patterns and the BS transmits two DCIs scheduling two TBs. In this case, the UE may miss DCI scheduling the second TB. The UE may have initial CS mapping values as shown in Table 13. In Table 13, the two letters before '+' indicate whether the first TB and the second TB are A/N, respectively, and Pos/Neg after '+' indicates the type of SR. For example, "NA+Neg" in Table 13 means that the first TB is NACK, the second TB is ACK, and the SR is negative. Similarly, "AN+Pos" means that the first TB is ACK, the second TB is NACK, and the SR is positive.

TABLE 13

| UCI combination | CS pattern | Initial CS mapping | | | |
|---|---|---|---|---|---|
| | | 0 | 3 | 6 | 9 |
| 2 bit A/N + SR | X = 1 | NN + Neg | NA + Neg | AA + Neg | AN + Neg |
| | X = 1 + 6 | NN + Pos | NA + Pos | AA + Pos | AN + Pos |
| 1 bit A/N + SR | X = 1 | N + Neg | | A + Neg | |
| | X = 1 + 6 | N + Pos | | A + Pos | |

When the UE fails to receive the DCI scheduling the second TB, if the UE knows that the reception result of the first TB is ACK and intends to transmit a negative SR, the UE selects a CS pattern of 1 and an initial CS value of 6. In this case, since the BS assumes that the corresponding UE has received both TBs, the BS may determine that the second TB is ACK (the UE has normally received the second TB). Eventually, N-to-A error (strictly, DTX-to-A error) occurs.

To solve this problem, the following two methods are proposed.

Proposed Method 1: Mapping based on Table 14 on the assumption of 2-bit A/N (in the case of 1-bit A/N, a second bit is regarded as NACK from the perspective of the UE)

TABLE 14

| UCI combination | CS pattern | Initial CS mapping | | | |
|---|---|---|---|---|---|
| | | 0 | 3 | 6 | 9 |
| 2 bit A/N + SR | X = 1 | NN + Neg | NA + Neg | AA + Neg | AN + Neg |
| | X = 1 + 6 | NN + Pos | NA + Pos | AA + Pos | AN + Pos |
| 1 bit A/N + SR | X = 1 | N + Neg | | | A + Neg |
| | X = 1 + 6 | N + Pos | | | A + Pos |

When the UE transmits 1-bit-A/N, the second bit may always be regarded as NACK as shown in Table 14. According to this mapping, the BS may always recognize the second TB as NACK when the UE transmits only the result for the first TB. Thus, the risk of N-to-A error (or DTX-to-A error) may be removed.

As another method, the N-to-A error (or DTX-to-ACK error) may be handled by modifying the 2-bit A/N mapping as shown in Table 15.

TABLE 15

| UCI combination | CS pattern | Initial CS mapping | | | |
|---|---|---|---|---|---|
| | | 0 | 3 | 6 | 9 |
| 2 bit A/N + SR | X = 1 | NN + Neg | NA + Neg | AN + Neg | AA + Neg |
| | X = 1 + 6 | NN + Pos | NA + Pos | AN + Pos | AA + Pos |
| 1 bit A/N + SR | X = 1 | N + Neg | | A + Neg | |
| | X = 1 + 6 | N + Pos | | A + Pos | |

Proposed Method 2: Mapping and transmitting A/N for second TB with different CS patterns as shown in Table 16

TABLE 16

| UCI combination | CS pattern | Initial CS mapping | | | |
|---|---|---|---|---|---|
| | | 0 | 3 | 6 | 9 |
| 2 bit A/N + SR | X = 1 | NN + Neg | NN + Pos | AN + Neg | AN + Pos |
| | X = 1 + 6 | NA + Neg | NA + Pos | AA + Neg | AA + Pos |
| 1 bit A/N + SR | X = 1 | N + Neg | N + Pos | A + Neg | A + Pos |
| | X = 1 + 6 | | | | |

As shown in Table 16, the UE may use the same CS pattern and different initial CS values when transmitting 1-bit A/N+SR, and the UE may use different CS patterns when transmitting A/N for the second TB. According to this mapping, when the UE transmits only the results for the first TB, the BS may always recognize the second TB as NACK. Thus, the risk of N-to-A error (or DTX-to-A error) may be removed.

In addition, a method of configuring 1-bit A/N+SR as shown in Table 15 has an advantage that compatibility with methods used in the conventional system is maintained. Proposed Method 2 may also be represented as shown in Table 17.

TABLE 17

| UCI combination | Initial CS mapping | CS pattern mapping (e.g., X = 1) |
|---|---|---|
| 2-bit A/N + SR | {0, 3, 6, 9} = {N + Neg, N + Pos, A + Neg, A + Pos} Note: A/N denotes ACK and NACK for first TB | {X, X + 6} = {N, A} Note: A/N denotes ACK and NACK for second TB |
| 1-bit A/N + SR | {0, 3, 6, 9} = {N + Neg, N + Pos, A + Neg, A + Pos} Note: A/N denotes ACK and NACK for first TB | Fixed to X |

Hereinafter, a method of using different CS patterns in a slot in which only an SR is transmitted (SR only slot) will be described.

Different CS patterns (or different PS patterns) may be used for PUCCH transmission where only SR information is transmitted. As an example, the BS may assign the same initial CS value to one UE for the SR information transmission. The BS may instruct the UE to transmit a specific SR (process or index) (separately configured by higher layers) based on X=1 and transmit another SR (process or index) based on X=7 (=1+6). As another example, the BS may assign the same initial CS value to a plurality of UEs (e.g., two UEs: UE1 and UE2) for the SR information transmission. The BS may instruct UE1 to transmit the SR based on X=1 and transmit the SR based on X=7 (=1+6).

According to the above method, there is an advantage in that the PUCCH resource capacity or UE multiplexing capacity for SR transmission increases, compared to when SR information is transmitted based on only the initial CS value. For example, if the number of different CSs available for the same initial CS value is N, the PUCCH resource capacity or UE multiplexing capacity may be doubled, so that 2N PUCCH resources and UEs may be supported.

In the above proposed methods, transmission of different information with different CS patterns may be modified into transmission of different information with different PS patterns. In addition, although the value of X is assumed to be 1 for convenience of description, X may be one of the coprime integers of 12 such as 1, 5, 7, 11, etc.

3.7. Embodiment 7

In Embodiments 1 to 6, methods in which a plurality of short sequences, each having a length of one RB, are repeatedly transmitted based on an interlace structure for a single PUCCH have been described. In Embodiment 7, a method of dividing a single long sequence, which has a length equivalent to the total number of REs corresponding to (or included in) a plurality of PRBs (e.g., N PRBs) constituting an interlace for a single PUCCH, into N parts (by 12 REs) and mapping and transmitting the PUCCH to each of the N PRBs will be described.

As an example, if the total number of PRBs included in a specific interlace is 10, the total number of REs included in the specific interlace is 10 (PRBs)*12 (subcarriers per PRB)=120. In this case, the length of a Zadoff-Chu (ZC) sequence is determined as the largest prime number less than or equal to 120. Since the largest prime number less than or equal to 120 is 113, the length of the ZC sequence may be 113. The remaining 7 REs may be configured to have the same values as the first part of the length-113 sequence. In other words, the CS may be applied. For example, when a set of 113 elements constituting the length-113 sequence is defined as follows: {e1, e2, . . . , e113}, the length-120 sequence may be defined as follows: {e1, e2, . . . , e113, e1, e2, . . . , e7} by copying and concatenating the first 7 elements to the end of the length-113 sequence. The length-120 sequence is divided into 10 parts, and each part is mapped to each PRB by 12 REs to perform PUCCH transmission.

As another example, if the total number of PRBs is 11, the total number of REs included in a specific interlace is 11 (PRBs)*12 (subcarriers per PRB)=132. In this case, the length of a ZC sequence is determined as the largest prime number less than or equal to 132. Since the largest prime number less than or equal to 132 is 131, the length of the ZC sequence may be 131. The remaining one RE may be configured to have the same value as the first part of the length-131 sequence. In other words, the CS may be applied. For example, when a set of 131 elements constituting the length-131 sequence is defined as follows: {e1, e2, . . . , e131}, the length-132 sequence may be defined as follows:

{e1, e2, . . . , e131, e1} by copying and concatenating the first one element to the end of the length-131 sequence. The length-132 sequence is divided into 11 parts, and each part is mapped to each PRB by 12 REs to perform PUCCH transmission When a PUCCH sequence is generated for U-band operation according to Embodiment 7, the PUCCH needs to be designed to have good PAPR/CM performance because the PUCCH is a UL channel transmitted by the UE. Therefore, the following method may be applied to improve the PAPR/CM performance.

Embodiment 7-1: Instead of using the largest prime number less than or equal to the total number of REs to which the PUCCH is mapped as the sequence length, a prime number with good PAPR/CM performance among prime numbers less than or equal to the total number of REs to which the PUCCH is mapped is used as the sequence length.

As an example, when the total number of PRBs included in a specific interlace is 11 (that is, when the total number of REs is 132), the PAPR/CM performance may be obtained as shown in FIG. 21.

Referring to FIG. 21, it may be seen that prime numbers whose the results of modulo 12 operation are 5 (and/or 7) have good PAPR/CM performance. Accordingly, the prime numbers whose the results of modulo 12 operation are 5 (and/or 7) may be selected as the sequence length.

Specifically, when the total number of PRBs included in the specific interlace is 11, the sequence length may be set to 127, 113, 103, 101, 89, etc.

As another example, when the total number of PRBs included in a specific interlace is 10 (that is, when the total number of REs is 120), the PAPR/CM performance may be obtained as shown in FIG. 22.

Referring to FIG. 22, it may be seen that prime numbers whose the results of modulo 12 operation are 5 (and/or 7) have good PAPR/CM performance. Accordingly, the prime numbers whose the results of modulo 12 operation are 5 (and/or 7) may be selected as the sequence length.

Specifically, when the total number of PRBs included in the specific interlace is 10, the sequence length may be set to 113, 103, 101, 89, 79, etc.

Embodiment 7-1 may be generalized as follows. When a prime number is less than or equal to the total number of REs included in a specific interlace and when the result of modulo 12 operation thereof is 5 (and/or 7), the prime number may be selected as the sequence length. The PUCCH sequence may be generated and/or transmitted according to the selected length.

Prime numbers greater than 30 and less than 132 and having the results of modulo 12 operation equal to 5 or 7 are listed as follows: 127, 113, 103, 101, 89, 79, 67, 53, 43, 41, and 31. The listed values may be used as the length of the PUCCH sequence.

Embodiment 7-2: The basic idea of Embodiment 7-2 follows Embodiment 7-1. However, to further reduce specification work, the same PUCCH sequence length may be configured even when the total number of PRBs included in a specific interlace is different (e.g., 11 RBs and 10 RBs).

As an example, the sequence length may be set to 113 (or 103) for both cases: when the total number of PRBs included in a specific interlace is 11 (that is, when the total number of REs is 132) and when the total number of PRBs included in a specific interlace is 10 (that is, when the total number of REs is 120).

As another example, the sequence length may be set to 103 (or 101) for both cases: when the total number of PRBs included in a specific interlace is 10 (that is, when the total number of REs is 120) and when the total number of PRBs included in a specific interlace is 9 (that is, when the total number of REs is 108).

The specification work may be simplified due to use of one sequence length, and the PAPR/CM performance may be guaranteed.

Embodiment 7-2 may be modified as follows: For an interlace having a larger total number of PRBs, a length-a PUCCH sequence may be first generated. Then, for an interlace where the total number of PRBs is less by n than the above interlace, n RBs may be punctured from the length-a sequence (as many as the difference in the total number of PRBs included in each interlace), and the rest of the sequence may be used.

As an example, for an interlace including a total of 11 RBs, a PUCCH sequence may be generated to have a sequence length of 113 (or 103) (by cyclic shifting). Then, for an interlace including 10 RBs, the last one RB may be punctured from the length-113 PUCCH sequence, and the remaining sequence may be used.

As another example, for an interlace including a total of 10 RBs, a PUCCH sequence may be generated to have a sequence length of 103 (or 101) (by cyclic shifting). Then, for an interlace including 9 RBs, the last one RB may be punctured from the length-103 PUCCH sequence, and the remaining sequence may be used.

As a further example, for an interlace including a total of 11 RBs, a PUCCH sequence may be generated to have a sequence length of 103 (or 101) (by cyclic shifting). Then, for an interlace including 10 RBs, the last one RB may be punctured from the length-103 PUCCH sequence, and the remaining sequence may be used. For an interlace including 9 RBs, the last two RBs may be punctured from the length-103 PUCCH sequence, and the remaining sequence may be used.

When the total number of PRBs included in a specific interlace is 9 (that is, when the total number of REs is 108), the PAPR/CM performance may be obtained as shown in FIG. 23.

Additionally, the method of configuring multiple sequences proposed above is not limited when a PUCCH signal is configured. That is, the principles/methods proposed in the present disclosure may be applied equally/similarly when one UL channel/signal (e.g., DMRS signal used for PUSCH demodulation, DMRS used for PUCCH demodulation, PRACH preamble, and SRS sequence) is configured with a plurality of sequences.

Additionally, when a single channel (e.g., PUCCH) and/or a single signal (e.g., DMRS) is configured with a single sequence, different CSs and/or PSs (or combinations thereof) may be applied to a plurality of channels/signals (or sequences configured therefor) may be applied. That is, one UE may be configured to simultaneously transmit the plurality of channels/signals (or sequences configured therefor) to which the different CSs and/or PSs (or combinations thereof) are applied (at the same time).

In addition, although the embodiments of the present disclosure have been described based on UL, the embodiments may be applied when any channel/signal is repeatedly transmitted in the frequency domain even in DL situations. For example, when frequency division multiplexing (FDM) is applied to a wake-up signal (WUS) sequence (for a specific purpose such as UE grouping) in eMTC/NB-IoT, the embodiments of the present disclosure may be applied. Since the WUS is transmitted in DL (BS→UE), the transmitter and receiver are reversed compared to the PUCCH transmission described above. Accordingly, the BS may perform the operations described as being performed by the UE in the embodiments of the present disclosure, and the UE may perform the operations described as being performed by the BS.

In addition, when a sequence used for UE-to-UE communication (e.g. D2D communication) and/or vehicle-to-vehicle communication (e.g. V2X communication) based on sidelink (SL) or a channel (e.g. feedback channel) and/or a signal (e.g. DMRS) configured with such a sequence is configured/mapped/transmitted, the principles/operations/methods in the embodiments of the present disclosure may be applied equally/similarly.

Although the embodiments of the present disclosure have been described based on the CGS, the embodiments may be applied when a general sequence is used. For example, when the base sequence is an M-sequence, the embodiments of the present disclosure may be applied by changing the initial value of a linear feedback shift register (LFSR) instead of changing the root index of a ZC sequence. The methods proposed in the embodiments are applicable when the M-sequence is cyclic shifted.

It is obvious that each of the examples of the proposed methods may also be included as one implementation method, and thus each example may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

The above-described generation of a pseudo-random sequence and a low-PAPR sequence based on the M-sequence may be performed with reference to Table 18, Table 19, and the operations defined in 3GPP TS 38.211.

---

5.2.1 Pseudo-random sequence generation

---

Generic pseudo-random sequences are defined by a length-31 Gold sequence. The output sequence $c(n)$ of length $M_{PN}$, where $n = 0, 1, \ldots, M_{PN} - 1$, is defined by $c(n) = (x_1(n + N_C) + x_2(n + N_C)) \bmod 2$
$x_1(n + 31) = (x_1(n + 3) + x_1(n)) \bmod 2$
$x_2(n + 31) = (x_2(n + 3) + x_2(n + 2) + x_2(n + 1) + x_2(n)) \bmod 2$ where $N_C = 1600$ and the first m-sequence $x_1(n)$ shall be initialized with $x_1(0) = 1, x_1(n) = 0, n = 1, 2, \ldots, 30$. The initialization of the second m-sequence, $x_2(n)$, is denoted by $$c_{init} = \sum_{i=0}^{30} x_2(i) \cdot 2^i$$

with the value depending on the application of the sequence.

---

5.2.2 Low-PAPR sequence generation

---

The low-PAPR sequence $r_{u,v}^{(\alpha,\delta)}(n)$ is defined by a cyclic shift a of α base sequence $\bar{r}_{u,v}(n)$ according to
$r_{u,v}^{(\alpha,\delta)}(n) = e^{j\alpha n}\bar{r}_{u,v}(n), 0 \leq n \leq M_{ZC}$
where $M_{ZC} = mN_{sc}^{RB}/2^\delta$ is the length of the sequence. Multiple sequences are defined from a single base sequence through different values of α and δ.
Base sequences $\bar{r}_{u,v}(n)$ are divided into groups, where $u = \{0, 1, \ldots, 29\}$ is the group number and v is the base sequence number within the group, such that each group contains one base sequence ($v = 0$) of each length $M_{ZC} = mN_{sc}^{RB}/2^\delta, \frac{1}{2} \leq m/2^\delta \leq 5$ and two base sequences ($v = 0, 1$) of each length $M_{ZC} = mN_{sc}^{RB}/2^\delta, 6 \leq m/2^\delta$. The definition of the base sequence $\bar{r}_{u,v}(0), \ldots, \bar{r}_{u,v}(M_{ZC} - 1)$ depends on the sequence length $M_{ZC}$.

5.2.2.1 Base sequences of length 36 or larger

For $M_{ZC} \geq 3N^{BB}r$, the base sequence $\bar{r}_{u,v}(0), \ldots, \bar{r}_{u,v}(M_{ZC} - 1)$ is given by
$\bar{r}_{u,v}(n) = x_q(n \bmod N_{ZC})$ $$x_q(m) = e^{-j\frac{\pi qm(m+1)}{N_{ZC}}}$$

where $q = \lfloor \bar{q} + \frac{1}{2} \rfloor + v \cdot (-1)^{\lfloor 2\bar{q} \rfloor}$
$\bar{q} = N_{ZC} \cdot (u + 1)/31$
The length $N_{ZC}$ is given by the largest prime number such that $N_{ZC} < M_{ZC}$.

5.2.2.2 Base sequences of length less than 36

For $M_{ZC} \in \{6, 12, 18, 24\}$, the base sequence is given by
$\bar{r}_{u,v}(n) = e^{j\varphi(n)\pi/4}, 0 \leq n \leq M_{ZC} - 1$
where the value of $\varphi(n)$ is given by Tables 5.2.2.2.-1 to 5.2.2.2-4.

---

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC_IDLE state, an RRC_INACTIVE state, and an RRC_CONNECTED stated. DRX is used for discontinuous reception of a paging signal in the RRC_IDLE state and the RRC_INACTIVE state. Now, DRX performed in the RRC_CONNECTED state (RRC_CONNECTED DRX) will be described below.

Figure 24:
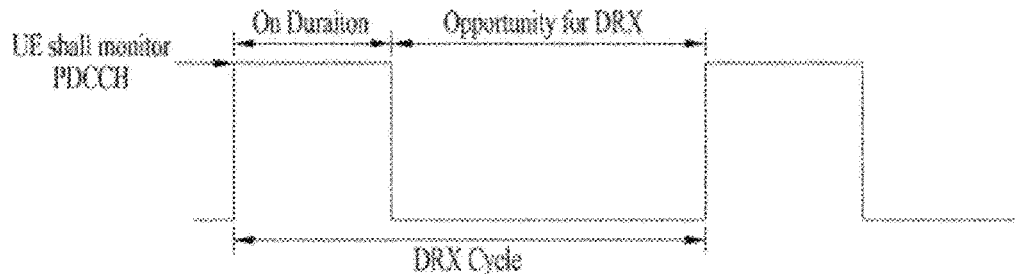

FIG. 24 is a diagram illustrating a DRX cycle (RRC_CONNECTED state).

Referring to FIG. 24, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 20 describes a UE operation related to DRX (in the RRC_CONNECTED state). Referring to Table 20, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 20.

TABLE 20

|  | Type of signals | UE procedure |
| --- | --- | --- |
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

Before performing the operations described in each embodiment of the present disclosure, the UE may perform the above-described DRX related operation. If the UE performs PDCCH monitoring during the On Duration and successfully detects a PDCCH while performing the PDCCH monitoring, the UE may perform at least one of the PUSCH scheduling related operations according to embodiments of the present disclosure.

Implementation Examples

Figure 25:
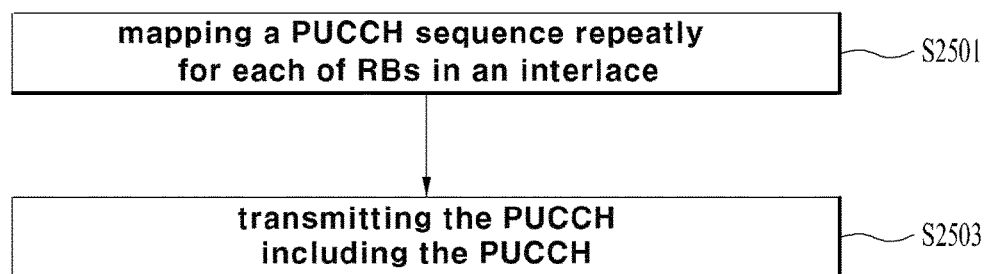

FIG. 25 is a flowchart illustrating a signal transmission/reception method according to embodiments of the present disclosure.

Referring to FIG. 25, the embodiments of the present disclosure may be performed by a UE. The embodiments of the present disclosure may include: repeatedly mapping a PUCCH sequence to each RB in an interlace (S2501); and transmitting a PUCCH including the PUCCH sequence in the interlace (S2503).

Specifically, to transmit the PUCCH sequence in the interlace, a CS value may change for each RB, a PS value may change for each RB, and/or UCI bit-to-constellation mapping may be applied to each RB as described above in Embodiments 1 to 6.

For example, the CS value of the PUCCH sequence may change for each RB based on the value of $m_{int}$ determined by multiplying the RB index of each RB by the value of X (or the value of X) as described in Embodiment 1-2 of the present disclosure.

Referring to Table 11, when the value of A is 1, 2, or 5, the PUCCH transmission performance increases. In particular, when the value of A is 5, the best PUCCH transmission performance is obtained, so the value of A may be 5.

As described above, the RB index of each RB may be a logical RB index within the interlace in which the PUCCH is transmitted, rather than an index assigned in consideration of the active BWP or the entire bandwidth. The RB index is sequentially assigned to each RB based on the frequency positions of the RBs in the interlace. For example, when the number of RBs included in the interlace is 11, RB indices from 0 to 10 may be assigned to the 11 RBs based on the frequency positions. When the number of RBs included in the interlace is 10, RB indices from 0 to 9 may be assigned to the 10 RBs based on the frequency positions.

A modulo operation may be performed on the value of $m_{int}$ determined by multiplying the RB index of each RB by the value of A (or the value of X) and a sequence length L (or the number of subcarriers for each RB, which is the same as the sequence length L). Alternatively, the modulo operation may be performed on a value obtained by adding factors used for conventional CS derivation to the value of $m_{int}$ and the sequence length L.

Although only the CS value of the PUCCH sequence may change for each RB, but the PS value may also change together with the CS value. The PS value may vary according to Embodiment 2. For example, the PS value for each RB may be determined based on the RB index of each RB.

In addition to the operations described with reference to FIG. 25, one or more of the operations described with reference to FIGS. 1 to 24 and/or the operations described in Embodiments 1 to 7 may be combined and additionally performed. As an example, the UE may perform UL LBT before transmitting the PUCCH. As another example, the UE may operate according to one or more of the methods described in Embodiments 1 to 5 when a single PUSCH and/or multiple PUSCHs are scheduled.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 26:
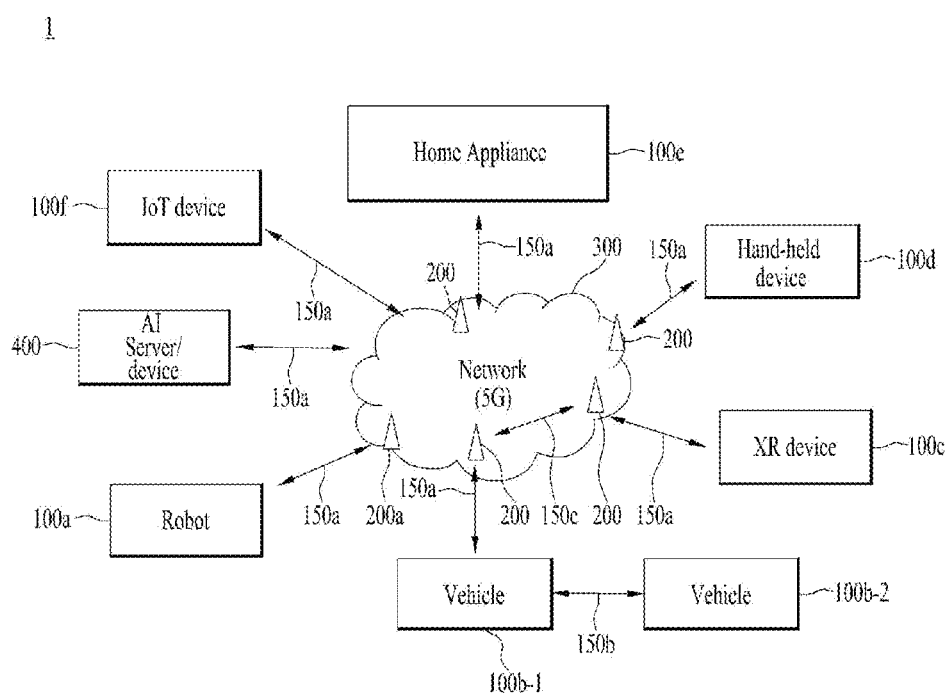
FIGS. 26 to 29 illustrate devices according to an embodiment of the present disclosure.

FIG. 26 illustrates a communication system 1 applied to the present disclosure.

Referring to FIG. 26, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 27:
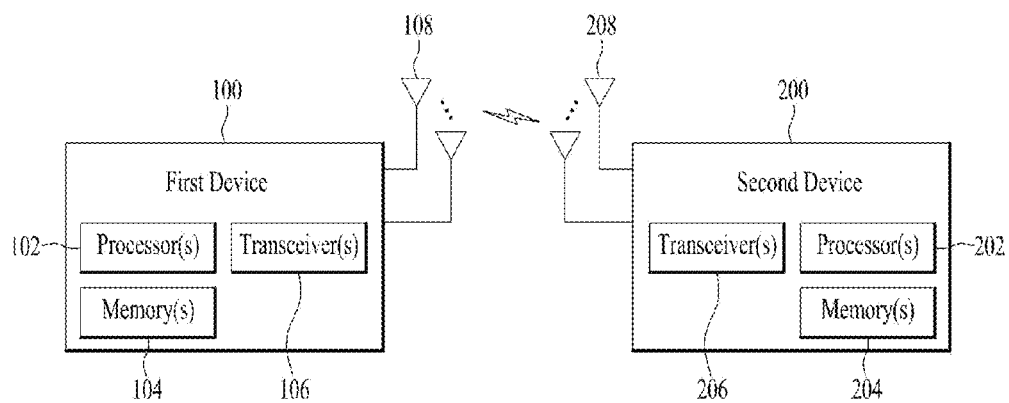

FIG. 27 illustrates wireless devices applicable to the present disclosure.

Referring to FIG. 27, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 28:
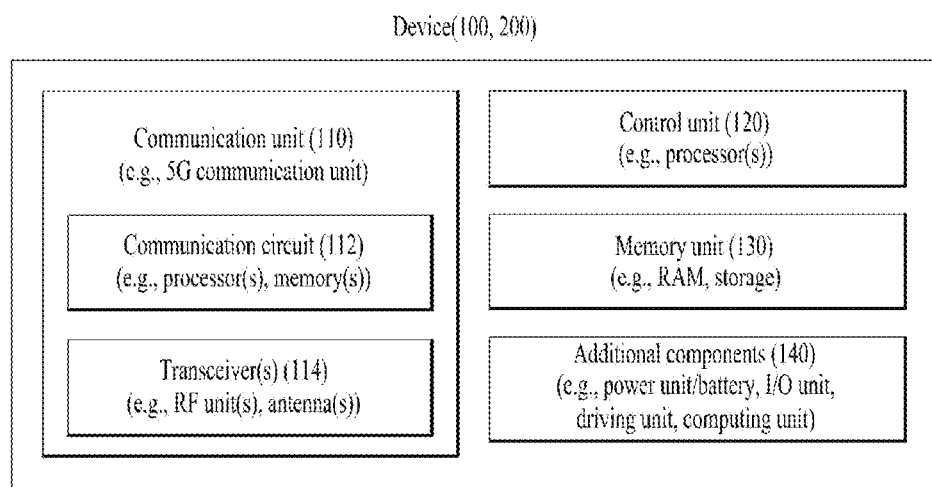

FIG. 28 illustrates another example of a wireless device applied to the present disclosure. The wireless device may be implemented in various forms according to a use case/service (refer to FIG. 26).

Referring to FIG. 28, wireless devices 100 and 200 may correspond to the wireless devices 100 and 200 of FIG. 27 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 26), the XR device (100c of FIG. 26), the hand-held device (100d of FIG. 26), the home appliance (100e of FIG. 26), the IoT device (100f of FIG. 26), a digital broadcasting terminal, a hologram device, a public safety device, an MTC device, a medical device, a FinTech device (or a finance device), a security device, a climate/environment device, the AI server/device (400 of FIG. 26), the BSs (200 of FIG. 26), a network node, or the like. The wireless device may be mobile or fixed according to a use case/service.

In FIG. 28, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 29:
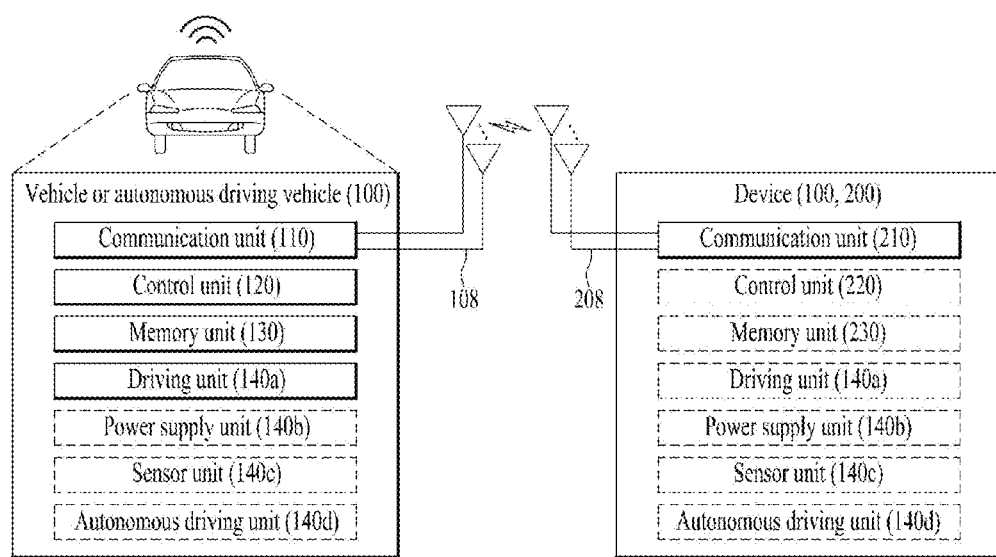

Example of Vehicle or Autonomous Driving Vehicle to which the Present Disclosure is Applied FIG. 29 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting and receiving a signal by a user equipment (UE) operating in a wireless communication system, the method comprising:
    repeatedly mapping a physical uplink control channel (PUCCH) sequence to each of resource blocks (RBs) in an interlace; and
    transmitting a PUCCH including the PUCCH sequence in the interlace,
    wherein a cyclic shift (CS) value of the PUCCH sequence varies based on a value determined by multiplying an RB index of each RB by a $\Delta$ value,
    wherein the $\Delta$ value is 5.

2. The method of claim 1, wherein RB indices are assigned sequentially to the RBs based on frequency positions of the RBs in the interlace.

3. The method of claim 1, wherein a modulo operation is performed on the value determined by multiplying the RB index of each RB by the Δ value and a number of subcarriers in each RB.

4. The method of claim 1, wherein a phase shift (PS) value is applied to each RB, and wherein the PS value is determined based on the RB index of each RB.

5. A user equipment (UE) configured to transmit and receive a signal in a wireless communication system, the UE comprising:
- at least one transceiver;
- at least one processor; and
- at least one memory operably connected to the at least one processor and configured to store instructions that, when executed, cause the at least one processor to perform operations comprising:
  - repeatedly mapping a physical uplink control channel (PUCCH) sequence to each of resource blocks (RBs) in an interlace; and
  - transmitting a PUCCH including the PUCCH sequence in the interlace,
- wherein a cyclic shift (CS) value of the PUCCH sequence varies based on a value determined by multiplying an RB index of each RB by a Δ value,
- wherein the Δ value is 5.

6. The UE of claim 5, wherein RB indices are assigned sequentially to the RBs based on frequency positions of the RBs in the interlace.

7. The UE of claim 5, wherein a modulo operation is performed on the value determined by multiplying the RB index of each RB by the Δ value and a number of subcarriers in each RB.

8. The UE of claim 5, wherein a phase shift (PS) value is applied to each RB, and wherein the PS value is determined based on the RB index of each RB.

9. An apparatus for a user equipment (UE), the apparatus comprising:
- at least one processor; and
- at least one computer memory operably connected to the at least one processor and configured to, when executed, cause the at least one processor to perform operations comprising:
  - repeatedly mapping a physical uplink control channel (PUCCH) sequence to each of resource blocks (RBs) in an interlace; and
  - transmitting a PUCCH including the PUCCH sequence in the interlace,
- wherein a cyclic shift (CS) value of the PUCCH sequence varies based on a value determined by multiplying an RB index of each RB by a Δ value,
- wherein the Δ value is 5.

10. The apparatus of claim 9, wherein RB indices are assigned sequentially to the RBs based on frequency positions of the RBs in the interlace.

11. The apparatus of claim 9, wherein a modulo operation is performed on the value determined by multiplying the RB index of each RB by the Δ value and a number of subcarriers in each RB.

12. The apparatus of claim 9, wherein a phase shift (PS) value is applied to each RB, and wherein the PS value is determined based on the RB index of each RB.

* * * * *